(12) United States Patent
Parker et al.

(10) Patent No.: US 9,995,985 B2
(45) Date of Patent: *Jun. 12, 2018

(54) ELECTROCHROMIC WINDOW FABRICATION METHODS

(71) Applicant: View, Inc., Milpitas, CA (US)

(72) Inventors: Ronald M. Parker, Olive Branch, MS (US); Robert T. Rozbicki, Germantown, TN (US); Yashraj Bhatnagar, Santa Clara, CA (US); Abhishek Anant Dixit, Memphis, TN (US); Anshu A. Pradhan, Collierville, TN (US)

(73) Assignee: View, Inc., Milpitas, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/364,162

(22) Filed: Nov. 29, 2016

(65) Prior Publication Data

US 2017/0115544 A1  Apr. 27, 2017

Related U.S. Application Data

(60) Division of application No. 14/512,297, filed on Oct. 10, 2014, which is a division of application No. (Continued)

(51) Int. Cl.
*G02F 1/153* (2006.01)
*G02F 1/15* (2006.01)
(Continued)

(52) U.S. Cl.
CPC ...... *G02F 1/1533* (2013.01); *B32B 17/10055* (2013.01); *B32B 17/1099* (2013.01);
(Continued)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS 4,950,888 A * 8/1990 Hamada ............... G02B 26/123
                                                        250/236
5,877,936 A  3/1999 Nishitani et al.
(Continued)

FOREIGN PATENT DOCUMENTS

CN        1537257 A      10/2004
JP     2011-128504 A      6/2011
(Continued)

OTHER PUBLICATIONS

U.S. Office Action dated Oct. 15, 2015 for U.S. Appl. No. 14/512,297.
(Continued)

*Primary Examiner* — Dawayne A Pinkney
(74) *Attorney, Agent, or Firm* — Weaver Austin Villeneuve & Sampson LLP; Brian D. Griedel

(57) ABSTRACT

Methods of manufacturing electrochromic windows are described. Insulated glass units (IGU's) are protected, e.g. during handling and shipping, by a protective bumper. The bumper can be custom made using IGU dimension data received from the IGU fabrication tool. The bumper may be made of environmentally friendly materials. Laser isolation configurations and related methods of patterning and/or configuring an electrochromic device on a substrate are described. Edge deletion is used to ensure a good seal between spacer and glass in an IGU and thus better protection of an electrochromic device sealed in the IGU. Configurations for protecting the electrochromic device edge in
(Continued)

the primary seal and maximizing viewable area in an electrochromic pane of an IGU are also described.

23 Claims, 21 Drawing Sheets

Related U.S. Application Data

13/456,056, filed on Apr. 25, 2012, which is a continuation-in-part of application No. 13/431,729, filed on Mar. 27, 2012, now Pat. No. 9,102,124, and a continuation-in-part of application No. 13/312,057, filed on Dec. 6, 2011, now Pat. No. 8,711,465, said application No. 13/431,729 is a continuation of application No. 12/941,882, filed on Nov. 8, 2010, now Pat. No. 8,164,818.

(60) Provisional application No. 61/421,154, filed on Dec. 8, 2010, provisional application No. 61/435,914, filed on Jan. 25, 2011.

(51) Int. Cl.
| | |
|---|---|
| G09G 3/19 | (2006.01) |
| H04N 9/16 | (2006.01) |
| B32B 17/10 | (2006.01) |
| G02F 1/161 | (2006.01) |
| B32B 37/18 | (2006.01) |
| B32B 38/00 | (2006.01) |
| G02F 1/1345 | (2006.01) |
| G02F 1/155 | (2006.01) |

(52) U.S. Cl.
CPC .. *B32B 17/10128* (2013.01); *B32B 17/10183* (2013.01); *B32B 17/10513* (2013.01); *B32B 17/10697* (2013.01); *B32B 17/10908* (2013.01); *B32B 17/10917* (2013.01); *B32B 37/18* (2013.01); *B32B 38/0008* (2013.01); *B32B 38/105* (2013.01); *G02F 1/13458* (2013.01); *G02F 1/155* (2013.01); *G02F 1/1523* (2013.01); *G02F 1/161* (2013.01); B32B 2333/12 (2013.01); B32B 2457/20 (2013.01); *Y10T 29/49002* (2015.01); *Y10T 83/0304* (2015.04); *Y10T 428/2419* (2015.01); *Y10T 428/24231* (2015.01)

(58) Field of Classification Search
CPC .......... G02F 1/0316; G02F 3/16; G02F 1/163; C09K 9/02; B60R 1/088; H04N 9/3137; H04N 9/22
USPC ................ 359/265–275, 277, 245–247, 242; 345/49, 105, 107; 248/817; 438/929
See application file for complete search history.

(56) References Cited

U.S. PATENT DOCUMENTS

| | | | |
|---|---|---|---|
| 5,995,271 A | 11/1999 | Zieba et al. | |
| 6,055,089 A * | 4/2000 | Schulz | G02F 1/163 |
| | | | 136/251 |
| 6,176,715 B1 | 1/2001 | Buescher | |
| 6,407,847 B1 | 6/2002 | Poll et al. | |
| 6,515,787 B1 | 2/2003 | Westfall et al. | |
| 6,822,778 B2 | 11/2004 | Westfall et al. | |
| 7,719,751 B2 | 5/2010 | Egerton et al. | |
| 7,777,933 B2 | 8/2010 | Piroux et al. | |
| 8,071,420 B2 | 12/2011 | Su et al. | |
| 9,019,588 B2 | 4/2015 | Brown et al. | |
| 9,454,053 B2 | 9/2016 | Strong et al. | |
| 9,703,167 B2 | 7/2017 | Parker et al. | |

| | | | |
|---|---|---|---|
| 2002/0149829 A1 | 10/2002 | Mochizuka et al. | |
| 2003/0137712 A1 | 7/2003 | Westfall et al. | |
| 2003/0227663 A1 | 12/2003 | Agrawal et al. | |
| 2004/0042059 A1 | 3/2004 | Minami et al. | |
| 2008/0030836 A1* | 2/2008 | Tonar | B60R 1/084 |
| | | | 359/271 |
| 2008/0266642 A1 | 10/2008 | Burrell et al. | |
| 2009/0304912 A1 | 12/2009 | Kwak et al. | |
| 2010/0067090 A1 | 3/2010 | Egerton et al. | |
| 2010/0243427 A1* | 9/2010 | Kozlowski | C03C 17/3417 |
| | | | 204/192.1 |
| 2010/0245973 A1 | 9/2010 | Wang et al. | |
| 2011/0096388 A1 | 4/2011 | Agrawal et al. | |
| 2011/0151383 A1 | 6/2011 | Yamashiro et al. | |
| 2011/0199666 A1 | 8/2011 | Chun et al. | |
| 2011/0211247 A1 | 9/2011 | Kozlowzki et al. | |
| 2011/0260961 A1 | 10/2011 | Burdis et al. | |
| 2011/0266137 A1 | 11/2011 | Wang et al. | |
| 2011/0266138 A1 | 11/2011 | Wang et al. | |
| 2011/0267674 A1 | 11/2011 | Wang et al. | |
| 2011/0267675 A1 | 11/2011 | Wang et al. | |
| 2012/0026573 A1 | 2/2012 | Collins et al. | |
| 2012/0033287 A1 | 2/2012 | Friedman et al. | |
| 2012/0147449 A1 | 6/2012 | Bhatnagar et al. | |
| 2012/0218620 A1 | 8/2012 | Kwak et al. | |
| 2012/0327499 A1 | 12/2012 | Parker et al. | |
| 2013/0222877 A1 | 8/2013 | Greer et al. | |
| 2013/0278988 A1 | 10/2013 | Jack et al. | |
| 2014/0253996 A1 | 9/2014 | Burdis et al. | |
| 2014/0340731 A1 | 11/2014 | Strong et al. | |
| 2015/0092260 A1 | 4/2015 | Parker et al. | |
| 2015/0362816 A1 | 12/2015 | Strong et al. | |
| 2016/0103379 A1 | 4/2016 | Kozlowzki et al. | |
| 2016/0114523 A1 | 4/2016 | Luten et al. | |
| 2016/0138328 A1 | 5/2016 | Behmke et al. | |
| 2016/0199936 A1 | 7/2016 | Luten et al. | |
| 2017/0176831 A1 | 6/2017 | Dixit et al. | |

FOREIGN PATENT DOCUMENTS

| | | |
|---|---|---|
| WO | WO2009/148861 A2 | 12/2009 |
| WO | WO2011/050291 A2 | 4/2011 |
| WO | WO2012/078634 A2 | 6/2012 |
| WO | WO2012/138281 A1 | 10/2012 |
| WO | WO2013/090209 A1 | 6/2013 |
| WO | WO2014/0201287 | 12/2014 |
| WO | WO2016/105549 A2 | 6/2016 |

OTHER PUBLICATIONS

U.S. Office Action dated May 10, 2016 for U.S. Appl. No. 14/512,297.
U.S. Notice of Allowance dated Oct. 4, 2016 for U.S. Appl. No. 14/512,297.
U.S. Notice of Allowance dated May 12, 2017 for U.S. Appl. No. 14/512,297.
U.S. Office Action dated Jan. 29, 2016 in U.S. Appl. No. 14/362,863.
U.S. Notice of Allowance dated May 6, 2016 in U.S. Appl. No. 14/362,863.
U.S. Notice of Allowance (corrected) dated May 19, 2016 in U.S. Appl. No. 14/362,863.
International Search Report and Written Opinion dated Mar. 29, 2013, in PCT/US2012/068817.
International Preliminary Report on Patentability dated Jun. 26, 2014 in PCT/US2012/068817.
International Search Report and Written Opinion dated Jun. 29, 2016, in PCT/US2015/00411.
International Search Report and Written Opinion dated Oct. 30, 2015, in PCT/US2015/039089.
International Preliminary Report on Patentability dated Jan. 12, 2017, in PCT/US2015/039089.
European Search Report dated Jul. 10, 2015 for EP Application No. 12857376.3.
European Office Action dated Jul. 28, 2016 for EP Application No. 12857376.3.

(56) References Cited

OTHER PUBLICATIONS

Singapore Search Report and Written Opinion dated Apr. 19, 2017 for SG Application No. 10201608917Q.
TW Office Action dated Oct. 20, 2016 in TW Application No. 101146775.
TW Office Action dated Feb. 15, 2017 in TW Application No. 101146775.
CN Office Action dated Feb. 4, 2017 in CN Application No. 201280061260.9.
CN Office Action dated Mar. 21, 2016 in CN Application No. 201280061260.9.
U.S. Appl. No. 15/491,869, filed Apr. 19, 2017, Strong et al.
US Preliminary Amendment filed Apr. 20, 2017 for U.S. Appl. No. 15/491,869.
CN Office Action dated Oct. 16, 2017 in CN Application No. 201280061260.9.
U.S. Appl. No. 15/934,854, filed Mar. 23, 2018, Parker et al.
U.S. Preliminary Amendment filed Apr. 17, 2018 in U.S. Appl. No. 15/934,854.

\* cited by examiner

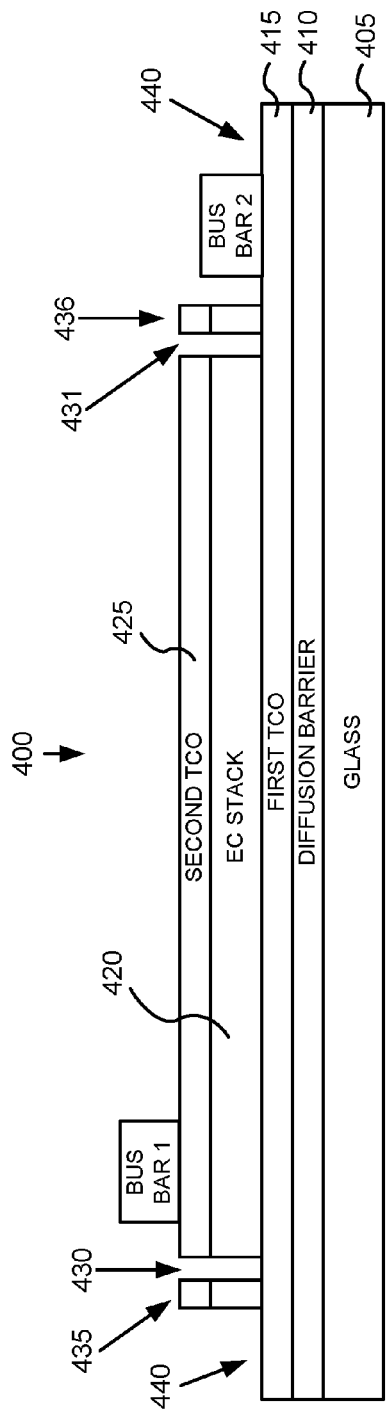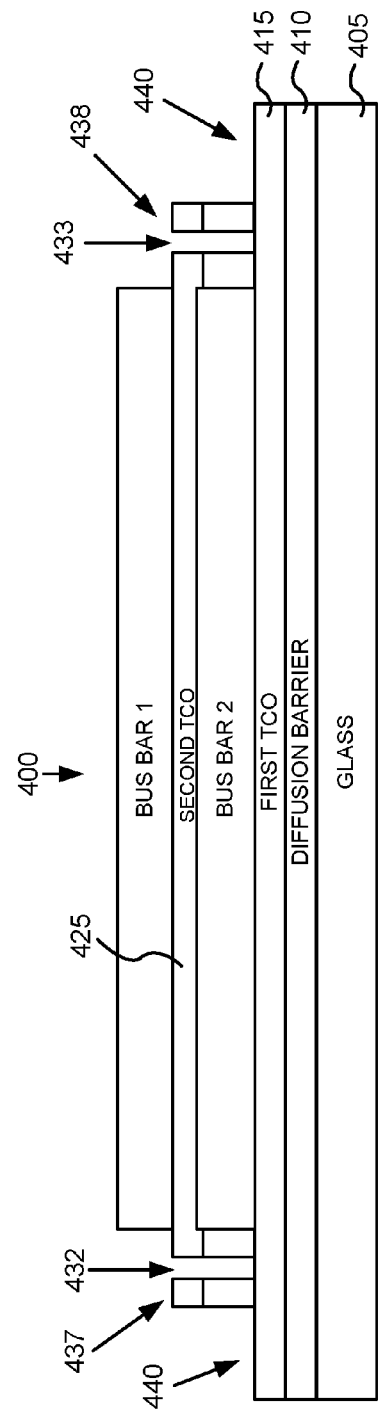

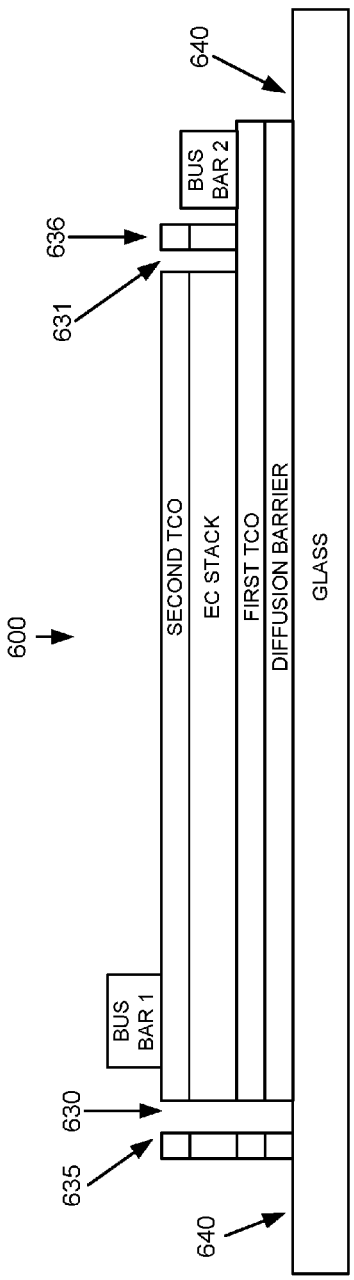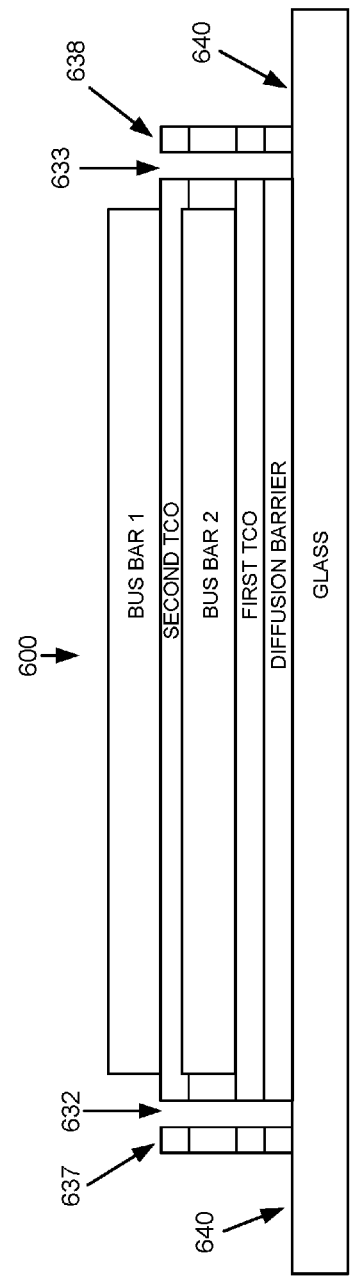

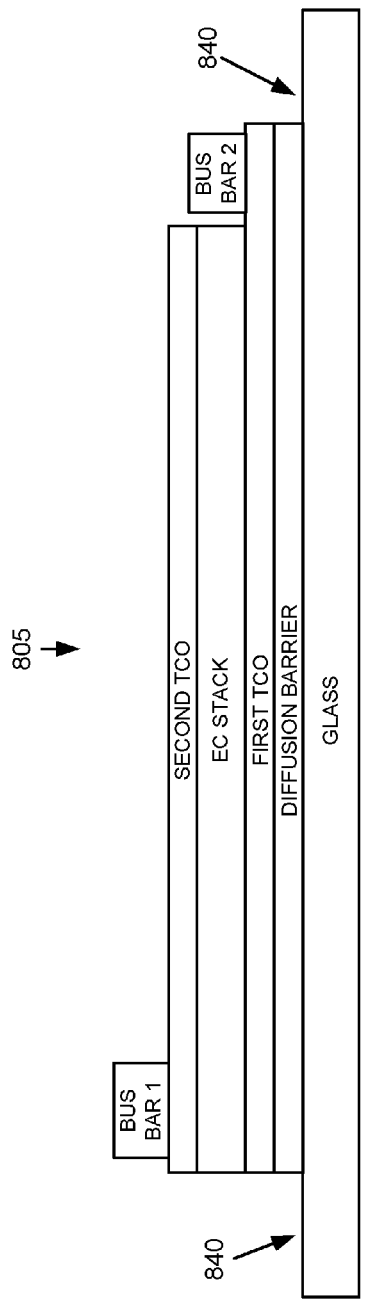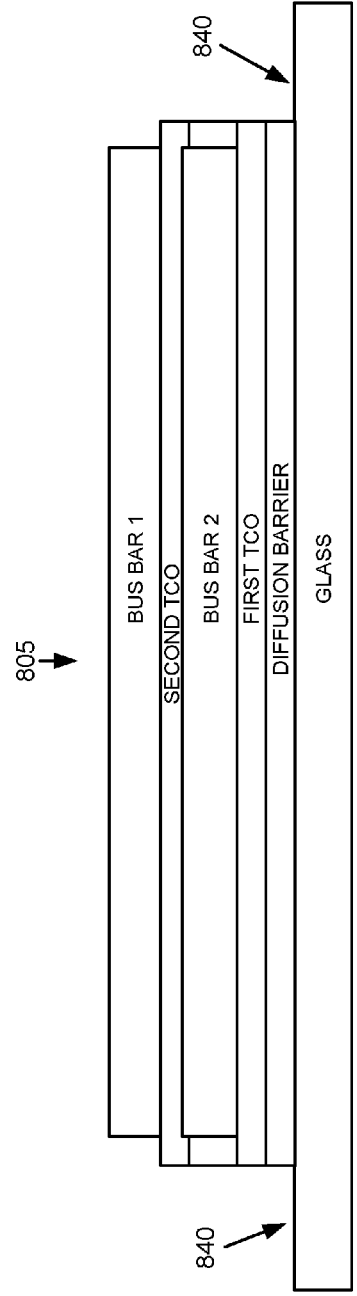

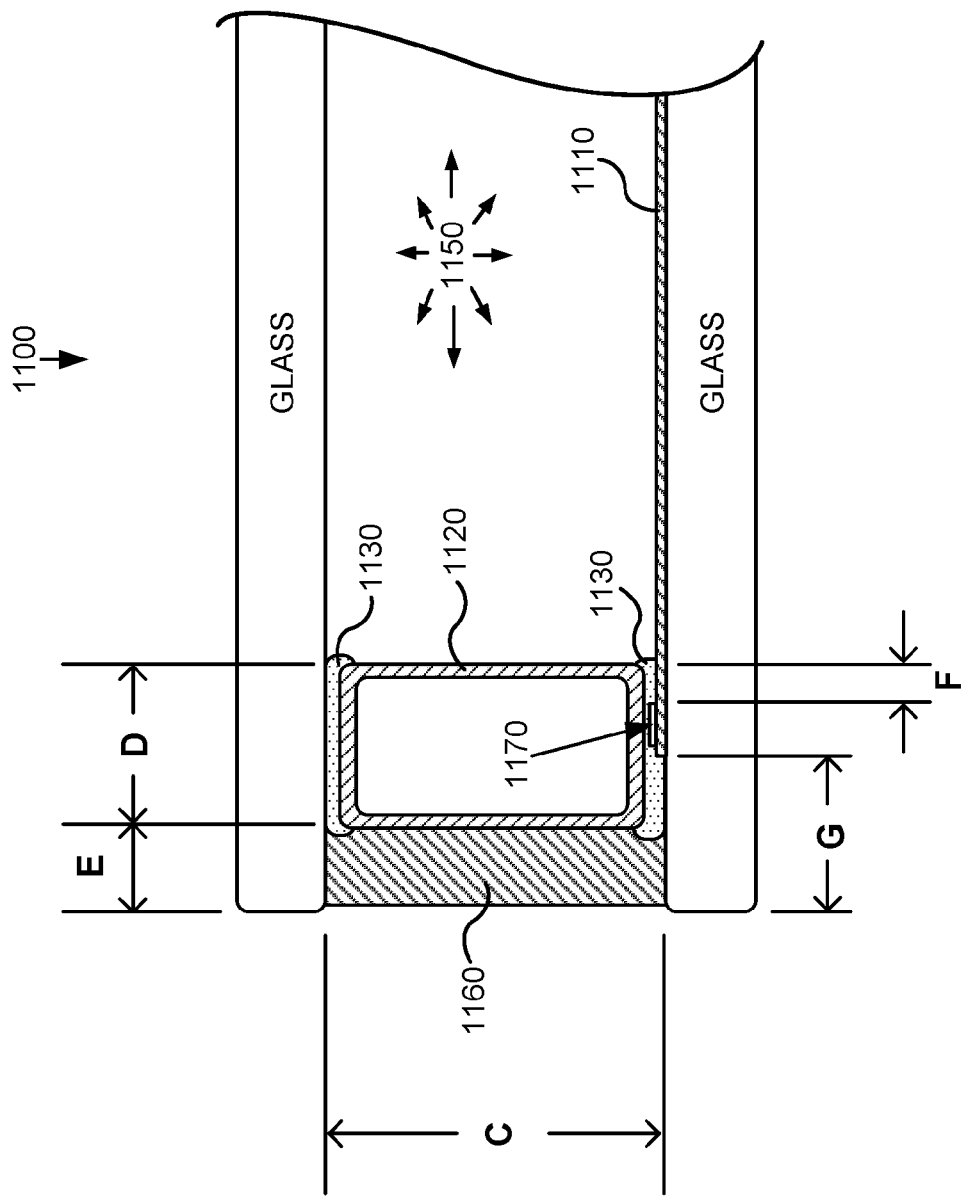

US 9,995,985 B2

ELECTROCHROMIC WINDOW FABRICATION METHODS

CROSS-REFERENCE TO RELATED APPLICATIONS

This application is a divisional of and claims priority to co-pending U.S. Pending application Ser. No. 14/512,297, filed on Oct. 10, 2014, titled "ELECTROCHROMIC WINDOW FABRICATION METHODS." U.S. Pending application Ser. No. 14/512,297 is a divisional of and claims priority to U.S. patent application Ser. No. 13/456,056, filed on Apr. 25, 2012, titled "ELECTROCHROMIC WINDOW FABRICATION METHODS," which is a continuation-in-part of and claims priority to both U.S. patent application Ser. No. 13/431,729, filed on Mar. 27, 2012, titled "ELECTROCHROMIC WINDOW FABRICATION METHODS" and U.S. patent application Ser. No. 13/312,057, filed on Dec. 6, 2011 (now U.S. Pat. No. 8,711,465), titled "SPACERS FOR INSULATED GLASS UNITS." U.S. patent application Ser. No. 13/431,729 is a continuation of and claims priority to U.S. patent application Ser. No. 12/941,882, filed on Nov. 8, 2010 (now U.S. Pat. No. 8,164,818), titled "ELECTROCHROMIC WINDOW FABRICATION METHODS." U.S. patent application Ser. No. 13/312,057 is a non-provisional application of and claims benefit to U.S. Provisional Patent Application No. 61/421,154, filed on Dec. 8, 2010, and to U.S. Provisional Patent Application No. 61/435,914, filed on Jan. 25, 2011. All of these applications are hereby incorporated by reference in their entireties and for all purposes.

FIELD

The invention relates generally to electrochromic devices, more particularly to electrochromic windows.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960's, electrochromic devices, and particularly electrochromic windows, still unfortunately suffer various problems and have not begun to realize their full commercial potential despite many recent advancements in electrochromic technology, apparatus and related methods of making and/or using electrochromic devices.

SUMMARY

Methods of manufacturing electrochromic windows are described. An electrochromic (or "EC") device is fabricated to substantially cover a glass sheet, for example float glass, and a cutting pattern is defined based on one or more areas in the device from which one or more electrochromic panes are cut. In various embodiments, the cutting pattern is defined, at least in part, only after the electrochromic device has been fabricated and characterized. In some cases, the cutting pattern is defined after taking into account the overall quality of the electrochromic device and/or the location of defects in the device. For example, the electrochromic device may be probed to determine the location of all defects or certain types or classes of defects. The cutting pattern then excludes those defects from usable window panes, resulting in an overall high-quality product and a high-yield process. In another example, the complete device sheet is inspected to determine the leakage current of the EC device or the resistivity of one or both of the EC device's electrode layers. If the leakage current is higher than a threshold or the resistivity of a TCO layer is higher than a threshold, the size of the electrochromic panes is limited to ensure that the resulting windows perform adequately in spite of the device's high leakage or the TCO's high resistivity.

In certain embodiments, inspection of the glass sheet and/or individual panes is performed at one or more points in the fabrication process. Various optical, electrical, chemical and/or mechanical metrology tests may be used to probe the product, for example, after EC device formation in order to define a cutting pattern for the glass sheet and/or after the individual panes are cut to test the individual panes. Individual layers of the EC device, the underlying substrate, etc. may be inspected. Inspection may include, for example, detection of defects in the EC device and/or edges of the glass.

One or more edge portions of the glass sheet may be removed prior to and/or as part of the patterning process to remove potential edge-related defects. Additionally, edges may be modified for strength, for example, by removing defects in the glass through mechanical and/or optical treatment. Separately, defective areas throughout the electrochromic device may be removed or mitigated by, for example, localized laser heating.

Laser scribes for isolating individual electrodes of EC devices on the individual electrochromic panes may be added prior to or after cutting the panes. Similarly, bus bars for delivering power to the EC device electrodes can be made before or after cutting the panes. A technique known as edge deletion (described below) can also be performed prior to or after cutting the electrochromic panes from the glass sheet.

Insulated glass units (IGU's) are fabricated from the cut electrochromic panes and optionally one or more of the panes of the IGU are strengthened. In certain embodiments, strengthening is accomplished by laminating glass or other reinforcing substrate to the cut panes. In a specific embodiment, the lamination is performed after the IGU is assembled.

A method of manufacturing one or more electrochromic panes may be characterized by the following operations: (a) fabricating an electrochromic device on a glass sheet; (b) defining a cutting pattern for cutting the glass sheet in order to create the one or more electrochromic panes, the cutting pattern defined, at least in part, by characterizing the glass sheet and/or electrochromic device by one or more physical features (characteristics) after fabrication of the electrochromic device; and (c) cutting the glass sheet according to the cutting pattern to create the one or more electrochromic panes. In one embodiment, characterizing the glass sheet and/or electrochromic device includes identifying the one or more low-defectivity areas, scribing one or more isolation trenches near one or more edges of the glass sheet, applying a temporary bus bar to the electrochromic device, and activating the electrochromic device in order to evaluate the electrochromic device for defectivity. Other methods of identifying defects, including areas of non-uniformity, in the EC device include application of polarized light to the glass pane and the like. In one embodiment, mapping data sets are created based on the one or more low-defectivity areas and/or non-uniform areas on the electrochromic device and the data sets are compared in order to maximize efficient use of the glass sheet.

In some embodiments, electrochromic devices employ all non-penetrating bus bars on the individual electrochromic panes. In this way, more viewable area is available in the electrochromic panes. The improved electrochromic panes may be integrated in IGU's and one or more of the panes may contain a strengthening feature such as a laminated substrate of glass, plastic or other suitable material.

Certain embodiments relate to methods and apparatus for protecting the edges of IGU's, for example, during handling and/or transport. Edge bumpers are described as well as methods of making edge bumpers, advantages and implementations. Edge bumpers are particularly useful for protecting IGU's that include annealed glass, but also protect tempered or strengthened glass IGU's.

Various embodiments include laser isolation configurations and related methods of patterning and/or configuring an electrochromic device on a substrate. In certain embodiments, edge deletion is used to ensure a good seal between the spacer and the glass in an IGU and thus better protection of an electrochromic device sealed in the IGU. Certain embodiments include EC devices without isolation scribes. Configurations for protecting the EC device edge in the primary seal and maximizing viewable area in an electrochromic pane of an IGU are also described. These embodiments are equally applicable to annealed glass, strengthened and tempered glass substrates, as well as non-glass substrates.

These and other features and advantages will be described in further detail below, with reference to the associated drawings.

BRIEF DESCRIPTION OF THE DRAWINGS

The following detailed description can be more fully understood when considered in conjunction with the drawings in which:

FIGS. 4A-B are cross section schematics depicting two side views of an electrochromic device.

FIGS. 6A-B are cross section schematics of an electrochromic device.

FIGS. 8B-C are cross section schematics depicting two side views of an electrochromic device.

FIG. 11 is a partial cross section of an IGU showing relative configurations of glass substrates, the electrochromic device, the bus bar, the spacer, the primary seal and the secondary seal.

DETAILED DESCRIPTION

Figure 1A:
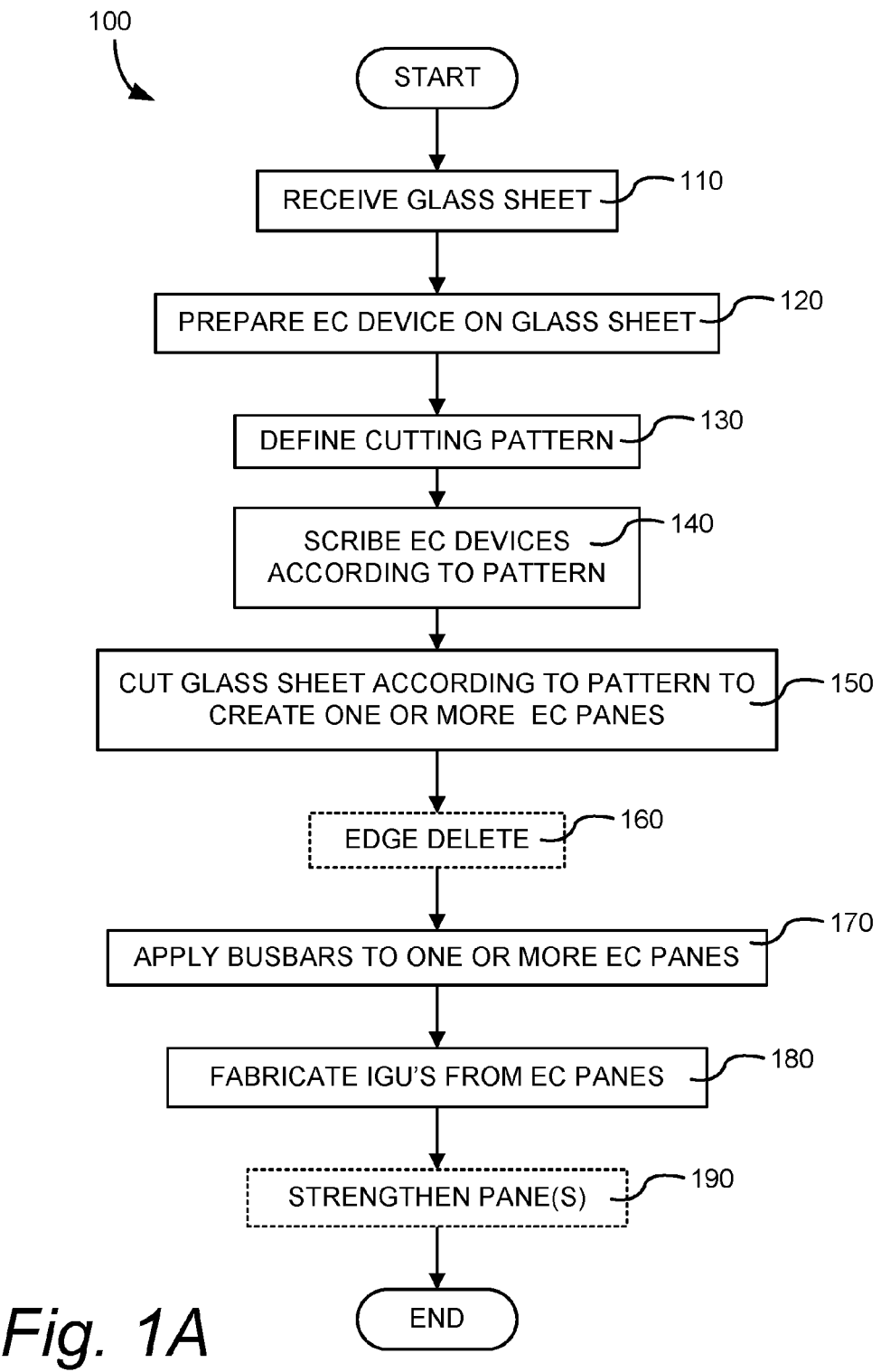
FIGS. 1A-B depict process flows describing aspects of fabrication methods of the invention.

For window applications, it is important that electrochromic panes be both strong and relatively free of defects. Conventionally, glass panes are strengthened by tempering. Unfortunately, the tempering process can introduce defects in an electrochromic device. Hence, most efforts to produce electrochromic windows employ a fabrication sequence of first cutting a glass pane to size, then tempering the glass, and finally forming the electrochromic device on the tempered window pane. The electrochromic device is typically formed by depositing a sequence of thin layers on one side of the pre-cut and tempered glass pane. Unfortunately, the described sequence of cutting and then forming the EC device frequently gives rise to some low quality electrochromic windows because modern fabrication processes often produce one or more visible defects on an electrochromic device. Of course, the manufacturer may refuse to tolerate low quality devices, but rejection of low quality panes corresponds to a reduction in yield.

As described herein, various fabrication methods can improve yield and quality. In these methods, initially an electrochromic device is fabricated to substantially cover a glass sheet. Only later is a cutting pattern for multiple electrochromic panes defined on the glass sheet. The cutting pattern may take into account various considerations including utilization of the sheet, defects in the EC device as fabricated, economic demand for particular sizes and shapes of EC panes, non-uniformity in the device and/or glass sheet, etc.

Frequently, problematic defects occur in only a very small or limited region or regions of the glass sheet. Once identified, these regions can be excluded when defining electrochromic panes in the cutting pattern. In this manner, the cutting pattern may account for high (or low) defectivity regions of the glass sheet. While it is often desirable to probe the EC device on the large glass sheet to identify and exclude regions of defects, it may sometimes be appropriate to exclude certain regions without probing the device. For example, it is sometimes observed that defects are concentrated around the perimeter of the large glass sheet. Therefore it is sometimes desirable to exclude the perimeter region from the pattern of electrochromic panes. In one example, between about 1 inches and about 10 inches around the perimeter of the glass sheet is removed after the electrochromic device is fabricated on the glass. In various embodiments, such perimeter regions are excluded as a matter of course, with the exact amount of excluded perimeter region being based on a knowledge of the quality control (QC) of a well-defined production fabrication process.

Scribes and/or bus bars for the individual panes are provided at some point after the cutting pattern is defined. As mentioned, these features may be provided to individual EC panes before and/or after the glass sheet is cut into one or more electrochromic panes according to the pattern. The cutting itself may employ a procedure that improves the strength of the resulting cut panes. Further, as explained below, the edges may be "finished" to mitigate problems created by cutting. Additionally, in some embodiments, IGU's are fabricated from the cut electrochromic panes and optionally one or more of the panes of the IGU are strengthened. More details of aspects of the invention are described below and with respect to the Figures.

FIG. 1A depicts a process flow, 100, including a sequence of operations for manufacturing one or more electrochromic panes. First a glass sheet is received, see 110. For the purposes of the embodiments described herein, a large glass sheet is intended to be cut into smaller panes at a later stage of the process. Typically, the panes are intended to be used as windows, so the physical dimensions as well as the optical and mechanical properties of the substrate should be appropriate for the intended window application. In a typical example, the large glass sheet employed at operation 100 is a piece of glass of between about 3 meters and about 6 meters in length on at least one side. In some cases, the glass is rectangular, being about 3 to 6 meters high and about 1.5 to 3 meters wide. In a specific embodiment, the glass sheet is about 2 meters wide and about 3 meters high. In one embodiment, the glass is six feet by ten feet. Whatever the dimensions of the glass sheet, the EC pane fabrication equipment is designed to accommodate and process many such sheets, fabricating EC devices on such sheets, one after another in succession.

Suitable glass for the glass sheet includes float glass, Gorilla® Glass (a trade name for alkali-aluminosilicate sheet glass available from Dow Corning, Corp. of Midland, Mich.) and the like. One of ordinary skill in the art would recognize that EC devices can be formed on other than glass substrates. Methods described herein are meant to include other substrates besides inorganic glass, for example, plexiglass would also work in some instances. For the purposes of simplicity, "glass sheet" is used from herein to encompass all types of window substrate, unless otherwise specifically qualified.

In one embodiment, the glass sheet is float glass, optionally coated with a transparent conducting oxide (TCO) and a diffusion barrier layer. Examples of such glasses include conductive layer coated glasses sold under the trademark TEC® Glass by Pilkington, of Toledo, Ohio and SUNGATE® 300 and SUNGATE® 500 by PPG Industries of Pittsburgh, Pa. The glass sheet has a size that is at least equal to the largest EC glass pane contemplated for manufacture. TEC® Glass is a glass coated with a fluorinated tin oxide conductive layer. Such glass typically also has a diffusion barrier layer between the TCO and the float glass to prevent sodium from diffusing from the glass into the TCO. In one embodiment, the glass sheet does not have a preformed TCO or diffusion barrier on it, for example, in one embodiment the diffusion barrier, a first TCO, an electrochromic stack and a second TCO are all formed in a single apparatus under a controlled ambient environment (infra). The glass sheet may be heat strengthened prior to fabrication of an electrochromic (EC) device thereon.

Next in the depicted process, an electrochromic (EC) device is prepared on the glass sheet, see 120. In the event that the glass sheet includes a pre-formed diffusion barrier and TCO, then the EC device uses the TCO as one of its conductors. In the event the glass sheet is float glass without any pre-formed coatings then typically 120 involves initially depositing a diffusion barrier layer, then a transparent conductor (typically a TCO) layer, and thereafter the remainder of the EC device is formed. This includes an EC stack having an electrochromic (EC) layer, a counter electrode (CE) layer and an ion conducting (IC) layer. After forming the EC stack, another transparent conductor layer (typically a TCO layer) is deposited as a second conductor (to deliver power to the EC stack). At this point, the EC device is completed and operation 120 is concluded. One or more capping layers may also be applied. In one example, a hermetic layer is applied to keep moisture out of the device. In another example, a low-E (emissivity) coating is applied.

As is understood by those of skill in the art, many different types of electrochromic devices exist, each having its own construction, electrode compositions, charge carrier, etc. Any of these devices may be employed in the windows described herein. Certain embodiments are described in relation to all solid state and inorganic electrochromic devices. Such all solid-state and inorganic electrochromic devices, and methods of fabricating them, are described in more detail in the following U.S. patent application Ser. No. 12/645,111, titled, "Fabrication of Low-Defectivity Electrochromic Devices," filed on Dec. 22, 2009 and naming Mark Kozlowski et al. as inventors; Ser. No. 12/645,159, titled, "Electrochromic Devices," filed on Dec. 22, 2009 and naming Zhongchun Wang et al. as inventors; Ser. Nos. 12/772,055 and 12/772,075, each filed on Apr. 30, 2010, and Ser. Nos. 12/814,277 and 12/814,279, each filed on Jun. 11, 2010—each of the latter four applications is entitled "Electrochromic Devices," each names Zhongchun Wang et al. as inventors. Each of the above patent applications is incorporated by reference herein for all purposes. In one embodiment, the electrochromic device is a low-defectivity all solid state and inorganic electrochromic device as described in the above applications. In one embodiment, the EC device is manufactured on the glass sheet in apparatus having a controlled ambient environment, that is, an apparatus in which the layers are deposited without leaving the apparatus and without, for example, breaking vacuum between deposition steps, thereby reducing contaminants and ultimately device performance. This manufacture may include deposition of a diffusion barrier on the glass sheet and the EC device including both electrodes (TCO layers).

As mentioned, inspections may be conducted internally at various points in the fabrication flow. For example, one or more of the TCO, EC, IC, CE layers may be inspected during processing. Optical, electrical, chemical, or mechanical inspections may be employed to characterize one or more parameters of the layers. Such parameters include, for example, optical density, sheet resistance, thickness, defectivity, morphology, and the uniformity of any of these across the glass substrate surface. Separately one or more inspections may be performed after the entire EC device is fabricated on the glass sheet surface. As explained elsewhere herein, such inspection may characterize defectivity at regions on the surface and/or non-uniformities in the EC device.

It would be understood by one of ordinary skill in the art that other switchable optical devices besides electrochromic devices may be employed in the described process. Many such devices are formed as layers on an underlying substrate. Examples of suitable optical devices include various liquid crystal devices and electrophoretic devices including rotating element and suspended particle devices. Any of these can be fabricated or otherwise provided on a large glass sheet and then processed as described herein.

Referring again to FIG. 1A, once the EC device is prepared, a cutting pattern is defined, see 130. As explained, defining a cutting pattern after depositing the electrochromic device affords considerable flexibility in determining which regions of the fabricated device are used and which are not used in the cut panes. It also, affords flexibility in determining appropriate sizes of the panes based on the overall quality of the fabricated electrochromic device. Of course, there are a range of considerations that drive the cutting pattern, and only some of them pertain to the quality or condition of the as fabricated device. Overall, the characteristics used in defining a pattern of EC panes on the glass sheet may include any one or more of the following: (1) local defectivity or other measure of local quality (for example, a local non-uniformity in sheet resistance), (2) demand for particular grades of product (for example some end users specify a particular grade or quality of EC pane), (3) demand for particular sizes and shapes of products, (4) remake demand (caused by breakages and/or low yield fabrication of certain types of EC panes), (5) current inventory of EC device types on the glass sheets and/or individual EC panes, (6) utilization of the area of the overall glass sheet, and (7) global properties of the EC device (for example, EC device leakage current and electrode (TCO) resistance). A global property might dictate the appropriate size or grade of the final EC pane(s). For example, high EC device leakage current or high TCO resistance might indicate that the resulting EC panes must be relatively small (for example, not greater than about 20 inches). Stated another way, the glass sheets, each with a fabricated EC device thereon, are binned based on global properties.

In some embodiments, one or more of the panes defined in the pattern are sized and shaped for residential window applications. In some cases, one or more of the panes defined in the pattern are sized and shaped for commercial window applications.

Based on the considerations above, defining a cutting pattern for cutting the glass sheet in order to create the one or more electrochromic panes can include characterizing one or more physical features of the glass sheet and/or electrochromic device after fabrication of the electrochromic device. In one embodiment, characterizing the one or more physical features include at least one of: 1) identifying one or more low-defectivity areas on the electrochromic device, 2) identifying one or more areas of non-uniformity in the electrochromic device, 3) identifying one or more areas where materials used to make the electrochromic device were deposited on the back side of the glass sheet; 4) identifying one or more performance characteristics of the electrochromic device; and 5) identifying one or more defects in the glass sheet. Identifying one or more low-defectivity areas in the electrochromic device is described in more detail below. Non-uniform areas in the EC device are, for example, areas where, for example, the coloration is not uniform due to variation in thickness of layers of the EC device, variation in properties of the device, for example, due to uneven heating during formation of the EC stack, and the like. Non-uniform areas thus may be independent of the number of, for example, short related optical defects. It may be desirable to remove these areas from the cutting pattern or include them in the cutting pattern but identify them as, for example, being areas from which a different quality of EC pane will be cut. Also, depending on the process conditions, materials used to make the electrochromic device can be deposited on the back side of the glass sheet due to overspray. This is undesirable and therefore the presence of backside deposition is a useful characteristic of the glass sheet after EC device formation. Areas with backside materials may be cleaned to remove the unwanted material and/or these areas are excluded from the cutting pattern. Performance characteristics of the electrochromic device are also an important parameter for characterizing the EC device. As described above, for example, an EC device may be used in different ways depending on whether it falls into a certain specification category. Identifying one or more defects in the glass sheet is also important, for example, irrespective of the EC device's performance, there may be a defect in the glass sheet, like a bubble or fissure trapped in the glass, which would be excluded from the cutting pattern due to its undesirable optical properties.

Figure 1B:
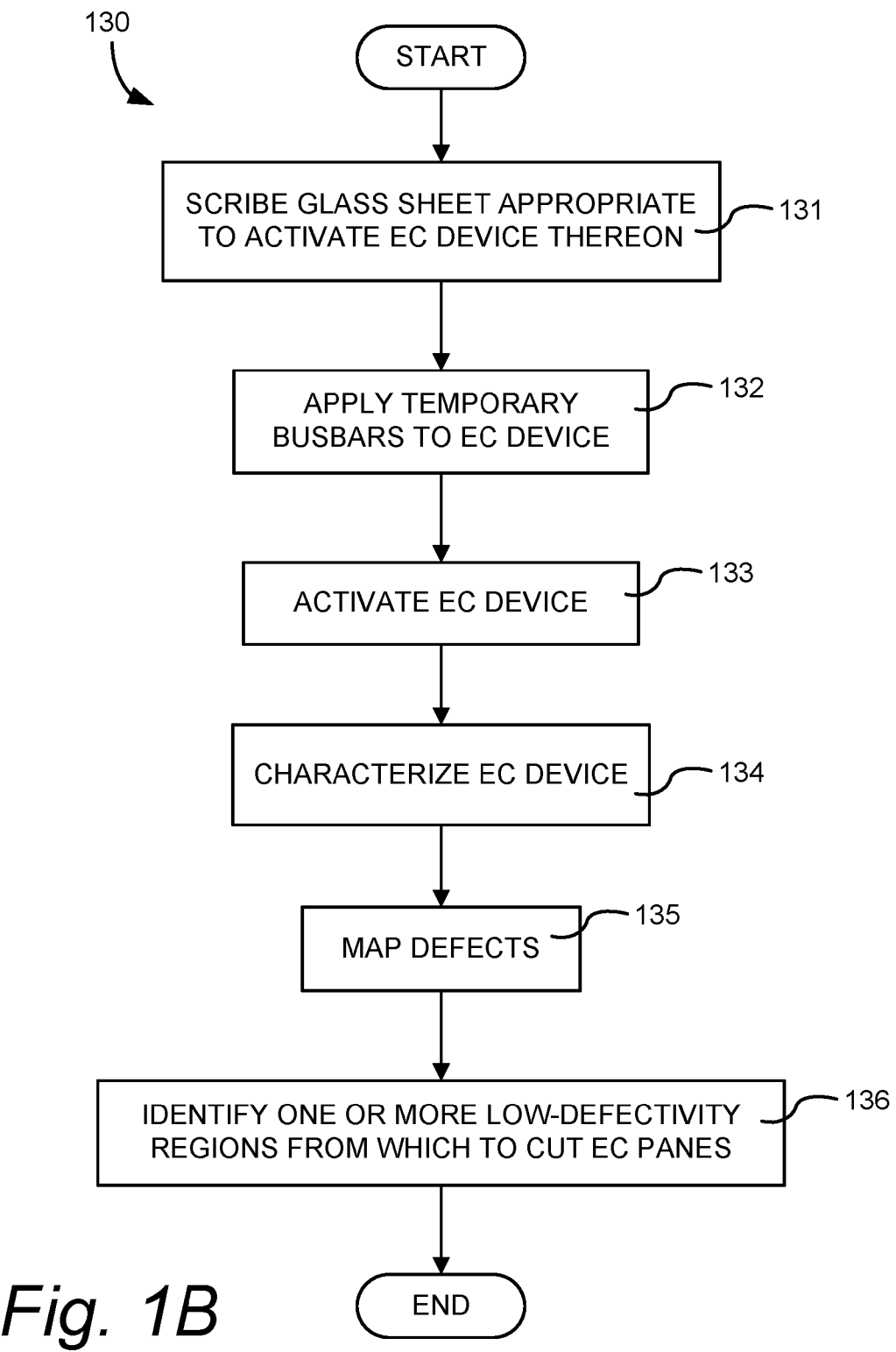

In a specific embodiment, the cutting pattern is defined (operation 130 of FIG. 1A) by first detecting and mapping the defectivity of the device across the glass sheet and then excluding or relegating areas of high defectivity from one or more electrochromic panes in the cutting pattern. FIG. 1B provides an example process flow for this embodiment. First, as depicted in block 131, the glass sheet's device is scribed in order to define a usable area, which is typically substantially the entire area of the device as prepared on the glass sheet. The scribing may serve two purposes. First it electrically isolates the two electrodes to provide a functioning device, and second it removes clearly defective portions of the EC stack. In some cases, deposited EC films in edge regions of the glass sheet exhibit roll off and/or other imperfections, and thus present the very real issue of short circuits. To address this problem, the edge regions of the device are isolated or removed. Techniques for accomplishing this include scribing (presented in FIG. 1B), edge deleting, or simply removing the glass sheet and associated device over some fraction of the perimeter.

After the scribe, temporary bus bars are applied, see 132. Then the device is activated by application of electrical energy to color or otherwise change the optical properties of the device so that the device can be characterized and any defects can be detected, see 133. Then device is characterized including identifying any defects and optionally classifying the defects as to type and/or severity, see 134. In some embodiments, non-uniformities in the EC device are characterized at this stage as well, and taken into account when defining the cutting pattern. In some embodiments this characterization includes the glass pane as well as the EC device on the glass pane. In some examples, the identification and/or classification is performed by the naked eye. In other examples, this operation is performed by an automated scanning device. In one embodiment, larger short-type visual defects are mitigated by application of electrical or optical energy. In a specific embodiment, such defects are circumscribed by laser ablation to create smaller pin-hole type defects. These mitigated defects may be included in the defect count when identifying regions of low defectivity. In another embodiment, this ablation or other mitigation is performed after the panes are cut from the glass sheet.

It should be understood that activating the EC device and scrutinizing the device is only one way to detect and identify defects. Other methods include using diffraction, reflection, or refraction of various forms of electromagnetic radiation that interact with the EC device, for example, polarized light and/or lock-in infrared (IR) thermography. Lock-in IR thermography is a non-destructive and non-contacting technique for the spatially resolved detection of small leakage currents in electronic materials that involves applying a temperature source to the material (in this case the EC device) and detecting leakage current induced temperature variations with, for example, an infrared camera. Thus, embodiments include not only activating the EC device to identify defects, but also may include, or use in the alternative, other methods of identifying defectivity.

As indicated, the cutting pattern defined on the glass sheet may exclude one or more high-defectivity areas of the electrochromic device provided on the glass sheet. Thus, the fabrication sequences contemplated herein frequently involve identifying regions of low or high defectivity prior defining a cutting pattern. In certain embodiments, "low-defectivity" areas are regions of the electrochromic device with fewer than a threshold number or density of defects. Defects may be identified and characterized in various ways. In certain embodiments, defects are identified and/or classified as described in U.S. patent application Ser. Nos. 12/645,111 and 12/645,159, both previously incorporated by reference.

In certain specific embodiments, only visual defects are considered when defining a cutting pattern. Visual defects include short-type defects that produce a halo when the device is darkened. A halo is a region in the device where an electrical short across the electrochromic stack causes an area around the short to drain current into the short and therefore the area surrounding the short is not darkened. These short defects are conventionally treated after fabrication of the electrochromic device, for example laser circumscribed to isolate them, or ablated directly to "kill" the short, and remove the halo effect, which leaves smaller short-related pinhole defects. In a typical example, defects visible to the naked eye are on the order of 100 μm in diameter. In one embodiment, for defects of the size regime greater than 100 μm, the total number of visible defects, pinholes and short-related pinholes created from isolating visible short-related defects, in a low-defectivity area is less than about 0.1 defects per square centimeter, in another embodiment less than about 0.08 defects per square centimeter, in another embodiment less than about 0.045 defects per square centimeter (less than about 450 defects per square meter of electrochromic pane). Smaller defects, for example defects not visible to the naked eye (on the order of 40 μm or less), may be tolerable in higher densities in some embodiments.

The defects that are detected and optionally classified in the glass sheet are mapped, see operation 135 of FIG. 1B. This can be done, for example, by marking the glass to show where the defects are located once the device is inactive, and/or by storing the defect pattern in a memory as a map. This mapping information is analyzed to identify one or more low-defectivity regions from which to cut the one or more EC panes, see 136. One embodiment of the depicted method defines the cutting pattern by (a) creating a first mapping data set based on the one or more low-defectivity areas on the electrochromic device; (b) creating a second mapping data set based on another one or more low-defectivity areas on a second electrochromic device on a second glass sheet; (c) comparing the first and second mapping data sets; and (d) defining the cutting pattern using the comparison of the first and second mapping data sets to maximize efficient use of the glass sheet. For example, the mapping may be used to match two compatible EC sheets for use in a single IGU so that defects in the respective panes do not align. In one implementation, the first and second mapping data sets are stored in a memory and (c) and (d) are performed using an appropriate algorithm or other logic. Thus, these mapping data sets and comparisons thereof define the most efficient use of the glass sheet's device. For example, mapping data for two glass sheets may indicate that the most efficient use of the glass would be to cut the two sheets to accommodate different customers' specifications due to defectivity patterns that, if not present, would otherwise dictate cutting the sheets according to a single customer's specifications. Additionally, the logic may define panes of varying sizes from each glass sheet in order to supply electrochromic panes for a variety of window types and end users, for example, by pane size, defectivity level and the like. Once the one or more low-defectivity regions are used to define the cutting pattern and process flow 130 ends.

Figure 2A:
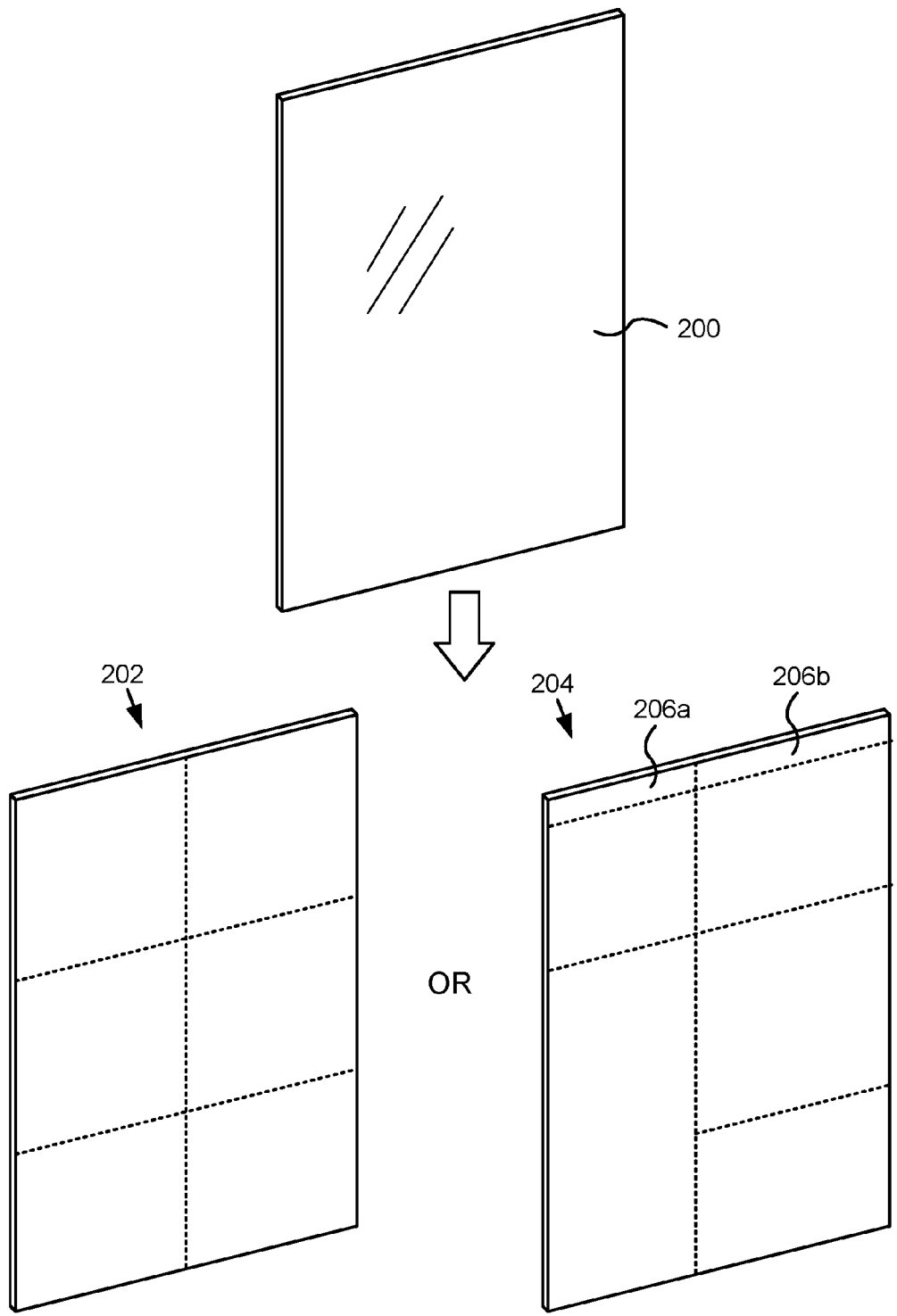
FIGS. 2A-B are schematics depicting aspects of fabrication methods of the invention.

FIG. 2A depicts a glass sheet, 200, for example about 3 meters by about 2 meters, or about 120 inches by 72 inches, with an EC device (not shown separately) thereon. In this example, in accord with process flow 100, a cutting pattern (as indicated by the dotted lines) is defined for cutting one or more electrochromic panes from glass sheet 200. Depending upon, for example, the defectivity, demand or other parameters described above, the cutting pattern can be regular, such as pattern 202, or irregular, such as pattern 204. Pattern 204 shows, for example, areas 206a and 206b, which collectively make a strip of glass that is to be discarded due to, for example, roll off and/or higher defect levels than the rest of the glass sheet. These perimeter areas may also be removed because of back side contamination of EC device materials due to overspray. From a single glass sheet, the one or more EC panes can be of the same size, or varying size depending on the need.

In some embodiments, prior to cutting the glass sheet, some or all edges of the sheet may be removed. In some embodiments about 1 to 10 inches of glass are removed around some, or all, of the glass sheet's perimeter. This edge trimming can be done for a variety of reasons. For example, the quality of the EC device may be inferior around the perimeter of the glass sheet. This low quality around the perimeter may be due to roll off of the EC device stack, imperfections in the edge of the glass sheet (which can interfere with the EC device fabrication), propagation of such edge defects (e.g. fissures), and cathode dimensions as they relate to the glass sheet dimensions during deposition. Also, deposition of materials on the back side of the glass sheet due to overspray may necessitate trimming the edges of the glass. Non-uniformities in the EC device may occur due to contact of the support pallet during processing of the EC device or non-uniform heating near the edges of the glass. Some of these defects can be appreciated without powering the EC device and therefore edge trimming may be performed prior to testing the device. Thus edge trimming may be performed as a matter of course or as a result of, for example, performing test runs of the EC formation and finding that the process parameters require that edge trimming be performed post device fabrication to remove non-uniformities and/or back side overspray.

Referring again to FIG. 1A, after the cutting pattern is defined for the one or more EC panes, scribes are performed according to the needs of each individual EC pane to be cut from the glass sheet, see 140. A more detailed description of scribes used to fabricate individual EC panes is described below in relation to FIGS. 3A-C. In this process flow, the scribes are made prior to the individual EC panes being cut from the glass sheet. This saves time and resources that would otherwise be needed in order to scribe the individual panes, since a wide variety of pane sizes are contemplated as arising from the single glass sheet. In other embodiments, the scribes are made after the glass sheet is cut into individual EC panes (infra).

In the depicted example, after the EC devices on the glass sheet have been scribed, they are cut from the glass sheet according to the cutting pattern, see 150. The cutting can be accomplished by any suitable process. In some cases, the cutting is accompanied by an edge finishing operation. Mechanical cutting typically involves scoring the glass with a hard tool, such as a diamond tip on a wheel, followed by snapping the glass along the score line. Thus, mechanical cutting includes "scoring" and breaking. Sometimes the term "scoring" is referred to as "scribing" in the glass window fabrication industry. However, to avoid confusion with other operations described herein, use of "scribe" will be reserved for these other operations.

Cutting can produce micro cracks and internal stresses proximate the cut. These can result in chipping or breaking of the glass, particularly near the edges. To mitigate the problems produced by cutting, cut glass may be subject to edge finishing, for example, by mechanical and/or laser methods. Mechanical edge finishing typically involves grinding with, for example, a grinding wheel containing clay, stone, diamond, etc. Typically, water flows over edge during mechanical edge finishing. The resulting edge surface is relatively rounded and crack-free. Laser edge finishing typically produces a flat, substantially defect free surface. For example, an initial cut through the glass, perpendicular to the surface of the glass, may make a substantially defect free cut. However the right angle edges at the perimeter of the glass are susceptible to breakage due to handling. In some embodiments, a laser is used subsequently to cut off these 90 degree edges to produce a slightly more rounded or polygonal edge.

Examples of cutting and optional edge finishing processes include the following: (1) mechanical cutting, (2) mechanical cutting and mechanical edge finishing, (3) laser cutting, (4) laser cutting and mechanical edge finishing, and (5) laser cutting and laser edge finishing.

In one embodiment, the panes are cut from the glass sheet in a manner that actually strengthens and/or improves the edge quality of the resulting panes. In a specific example, this is accomplished using laser induced scoring by tension. In this method, a gas laser, for example a $CO_2$ laser with a wavelength of 10.6 μm, is used to heat the surface of the glass along a line to produce a compressive stress in the glass along the line. A cooling device, for example a gas and/or water jet, is used to quickly cool the heated line. This causes a score to form in the glass along the line. The glass is then snapped by, for example, a conventional mechanical breaking device along the score. Using this method, the cut edges are extremely clean, that is, there are minimal if any defects in the glass that can propagate and cause further breakage due to stresses applied to the pane. In one embodiment, the edges are subsequently mechanically and/or laser finished to remove the 90 degree edges to create a more rounded and/or polygonal edge.

Referring again to FIG. 1A, optionally, edge deletion is carried out on the individual EC panes, see 160. Edge deletion is part of a manufacturing process for integrating the electrochromic device into, for example an IGU, where edge portions of the EC device, for example roll off (where layers of the device can make contact due to non-uniformity near the edge of for example a mask) and/or where a cut is made, are removed prior to integration of the device into the IGU or window. In certain embodiments, where unmasked glass is used, removal of the coating that would otherwise extend to underneath the IGU spacer is performed prior to integration into an IGU. Edge deletion is also used when a pane is cut from the glass sheet, as the panes will have EC material running to the edges of the pane. In one embodiment, isolation trenches are cut and the isolated portions of the EC device on the perimeter of the panes is removed by edge deletion.

Edge deletion can be performed at any stage post formation of the EC device in the process flows described. The process of performing edge deletion is, in some embodiments, a mechanical process such as a grinding or sandblasting process. An abrasive wheel may be employed in for grinding. In one embodiment, edge deletion is done by laser, for example, where a laser is used to ablate EC material from the perimeter of the pane. The process may remove all EC layers including the underlying TCO layer or it may remove all EC layers except this bottom TCO layer. The latter case is appropriate when the edge delete is used to provide an exposed contact for a bus bar, which must be connected to the bottom TCO layer. In some embodiments, a laser scribe is used to isolate that portion of the bottom TCO that extends to the edge of the glass from that which is connected to the bus bar in order to avoid having a conductive path to the device from the edge of the glass, as well as to protect from moisture encroachment into the IGU along the same path, as the device layers themselves as they are oftentimes permeable, albeit slowly, to moisture.

In particular embodiments, electromagnetic radiation is used to perform edge deletion and provide a peripheral region of the substrate, substantially free of EC device. In one embodiment, described in more detail below, the edge deletion is performed at least to remove material including the bottom transparent conductor. In one embodiment, the edge deletion also removes any diffusion barrier. In certain embodiments, edge deletion is performed to the surface of the substrate, e.g. float glass, and may include removal of some portion of the surface of the substrate. Exemplary electromagnetic radiations includes UV, lasers and the like. For example, material may be removed with directed and focused energy of one of the wavelengths including 248,355 nm (UV), 1030 nm (IR, e.g. disk laser), 1064 nm (e.g. Nd:YAG laser), and 532 nm (e.g. green laser). Laser irradiation is delivered to the substrate using, e.g. optical fiber or an open beam path. The ablation can be performed from either the substrate side or the EC film side depending on the choice of the electromagnetic radiation wavelength and, e.g., substrate handling equipment configuration parameters. The energy density required to ablate the film thickness is achieved by passing the laser beam through an optical lens. The lens focuses the laser beam to the desired shape and size. In one embodiment, a "top hat" beam configuration is used, e.g., having a focus area of between about 0.2 $mm^2$ to about 2 $mm^2$. In one embodiment, the focusing level of the beam is used to achieve the required energy density to ablate the EC film stack. In one embodiment, the energy density used in the ablation is between about 2 $J/cm^2$ and about 6 $J/cm^2$.

During the laser edge delete process the laser spot is scanned over the surface of the EC device, along the periphery. In one embodiment, the laser spot is scanned using a scanning F theta lens. Homogeneous removal of the EC film is achieved by overlapping the spots' area during scanning between about 5% and about 75%. For example, a first laser scan during a laser edge delete process may be used to remove a portion of the EC device. In a second laser scan during the laser edge delete process, the laser spot may overlap with the first scan (i.e., EC device material already removed) by between about 5% and about 75% to aid in achieving homogeneous removal of the EC film. Various scanning patterns may be used, e.g., scanning in straight lines or curved lines, and various patterns may be scanned, e.g., rectangular or other shaped sections are scanned which, collectively, create the peripheral edge deletion area. In one embodiment, the scanning lines are overlapped between about 5% and about 75%. That is, the area of the ablated material defined by the path of the line previously scanned is overlapped with later scan lines so that there is overlap. In another embodiment, the patterns are overlapped between about 5% and about 50%. That is, a pattern area ablated is overlapped with the area of a subsequent ablation pattern. For embodiments where overlapping is used, a higher frequency laser, e.g. in the range of between about 11 KHz and about 500 KHz, may be used. In order to minimize heat related damage to the EC device at the exposed edge (a heat affected zone or "HAZ"), shorter pulse duration lasers are used. In one example, the pulse duration is between about 100 fs (femtoseconds) and about 100 ns (nanoseconds), in another embodiment between about 100 fs and about 10 ns, in yet another embodiment between about 100 fs and about 1 ns.

When edge deletion is to be used, it can be done before or after the EC panes are cut from the glass sheet. In certain embodiments, edge deletion may be carried out in some edge areas prior to cutting the EC panes, and again after they are cut. In certain embodiments, all edge deletion is performed prior to cutting the panes. In embodiments employing "edge deletion" prior to cutting the panes, portions of the EC device on the glass sheet can be removed in anticipation of where the cuts (and thus edges) of the newly formed EC panes will be. In other words, there is no actual edge yet, only a defined area where a cut will be made to produce an edge. Thus "edge deletion" is meant to include removing EC device material in areas where an edge is anticipated to exist.

Referring again to FIG. 1A, after the optional edge deletion, bus bars are applied to the one or more EC panes, see 170. As with edge deletion, the addition of bus bars can be performed after the EC panes are cut from the glass sheet or before, but after scribing. By performing the scribe, edge deletion and bus bar application prior to cutting the panes from the glass sheet, the associated special handling steps for a variety of EC pane sizes are avoided. That is, performing various manipulations and/or component integrations before the individual panes are cut from the glass sheet allows use of apparatus for handling the glass sheets of uniform size for maximum efficiency. However, in one embodiment, the glass sheet is cut according to 150, then edge deletion is performed according to 160, and thereafter the EC devices are scribed according to 140. In this embodiment, edge deletion is performed at the edges of the individual EC panes, and then the scribes are applied. In another embodiment, the glass sheet is cut according to 150, then the EC devices are scribed according to 140, and then edge deletion is performed according to 160. One advantage of scribing and deleting post cutting is uniformity in the edge deletion process, since only material from the perimeter where actual cut edges (rather than from areas where an edge is anticipated to exist post cutting) is removed. This method may include higher quality control since the edge of the glass can be used as a guide for the edge deletion.

After the panes with fully assembled EC devices are completed, IGU's are manufactured using the one or more EC panes, see 180. Typically, an IGU is formed by placing sealing separator, for example, a gasket or seal (for example made of PVB (polyvinyl butyral), PIB or other suitable elastomer) around the perimeter of the glass sheet. In some embodiments, the sealing separator includes a metal, or other rigid material, spacer and sealant between the spacer and each glass pane. After the panes are sealed to the spacer, a secondary seal is provided around the outer perimeter of the spacer, for example a polymeric material that resists water and that adds structural support to the assembly. Typically, but not necessarily, a desiccant is included in the IGU frame or spacer during assembly to absorb any moisture. In one embodiment, the sealing separator surrounds the bus bars and electrical leads to the bus bars extend through the seal. Typically, but not necessarily, the IGU is filled with inert gas such as argon. The completed IGU can be installed in, for example, a frame or curtain wall and connected to a source of electricity and a controller to operate the electrochromic window.

Figure 2B:
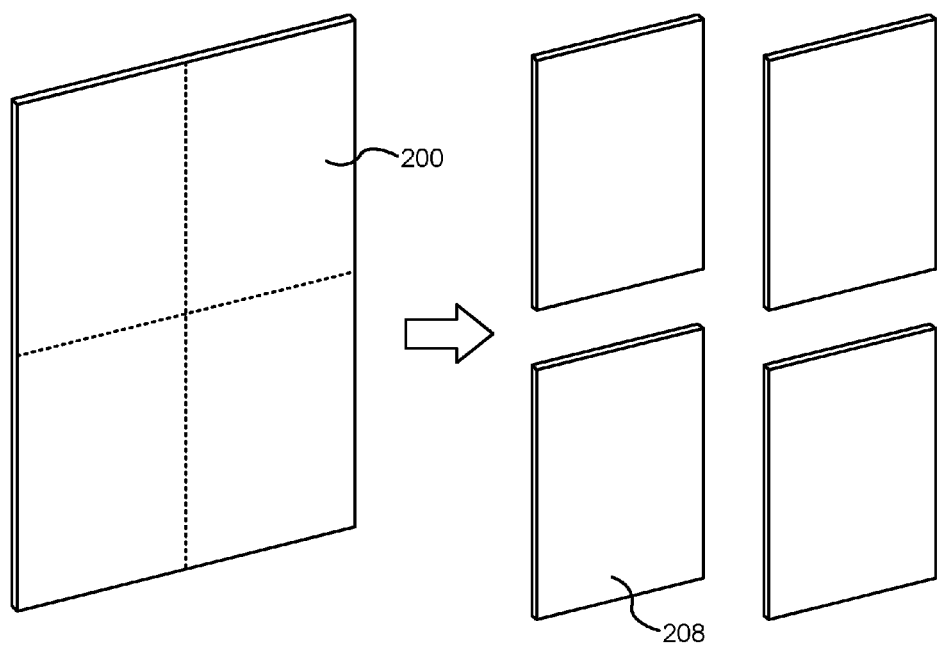
Figure 2B:
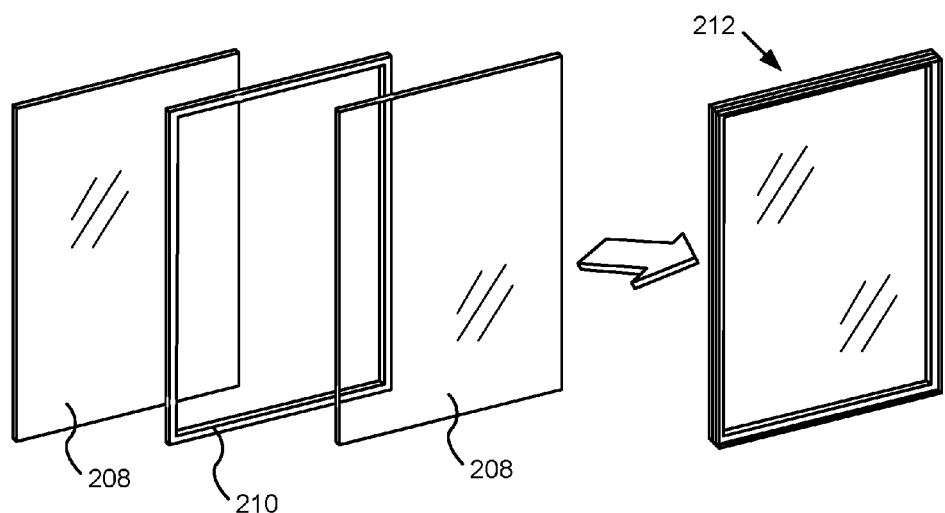

Referring to FIG. 2B, glass sheet 200 is cut according to a cutting pattern derived, for example, as described herein. In this example four (EC) panes, 208, are produced. Further, in this example, two of panes 208 are paired and combined with a sealing separator, 210, to form an IGU, 212. In this example, IGU 212 has two EC panes. Typically, but not necessarily, the panes are arranged so that EC devices face inside the IGU so as to be protected from the ambient. Electrochromic windows having two or more electrochromic panes are described in U.S. patent application Ser. No. 12/851,514, filed on Aug. 5, 2010, and entitled "Multipane Electrochromic Windows," which is incorporated by reference herein for all purposes. Methods described therein are particularly useful for making one or more electrochromic panes for use in multipane electrochromic windows. One advantage to such multipane electrochromic windows is that the likelihood of two defects aligning perfectly, and thus being observable to the end user, is quite small. This advantage is accentuated when low-defectivity panes are used. In embodiments where, for example, two electrochromic panes are used in a single window, the aforementioned (defect) mapping data sets can be used to further ensure that defects on individual panes, when registered in an IGU, do not align. This is yet another criterion that may be considered in patterning the glass sheet.

In certain embodiments, the glass sheet is up to 5 mm or even up to 6 mm thick (up to ¼ inch). In some embodiments, one or more panes are strengthened. Referring again to FIG. 1A, optionally, one or both panes of the IGU are strengthened, see 190. For example, in one embodiment, strengthening includes laminating one or more of the panes of the IGU with, for example, a thicker pane of float glass, a pane of tempered glass, a polymeric pane such as plexiglass, Gorilla® Glass, and the like. In another embodiment, strengthening includes applying a polymeric coating to one or more panes of the IGU. Examples of such polymeric coatings include ormosil polymeric coatings (epoxy resin, an amine hardener and a silane), sol-gel coatings, acrylic glazes, and other safety glazes, for example commercially available glazes which meet one or more impact test standards. Referring again to FIG. 1A, after one or more panes of the IGU are strengthened, process flow 100 ends.

In some embodiments, an edge bumper is employed to protect the edges of the glass after incorporation in the IGU. The protection allows the IGU to be safely transported from manufacturer to installation, for example. A protective edge bumper may be applied to IGU's with or without strengthened panes. Thus, the bumper may be installed to an IGU prior to strengthening one or both panes, e.g., until such time strengthening is desired, e.g., as there may be a decision as to which type of strengthening desired. Using methods described herein, that choice can be made at any time post-IGU fabrication. Edge bumpers described herein allow handling, transport and storage of the IGU's, e.g., until the type of strengthening, if any, is selected. In one embodiment, the protective bumper is a U-channel cap which fits over the glass edges around the perimeter of the IGU. It may be made from an elastomeric or plastic material. In one example, it is a vinyl cap. Edge bumpers described herein are suitable for any IGU to protect the edges of the IGU. Edge bumper embodiments are described in more detail below.

Generally, an edge bumper is configured to protect the edges of the glass in an IGU. This is particularly important when using non-tempered glass. Damage to the glass edges can happen easily if unprotected, because the IGU's are handled, manually and/or mechanically, after fabrication in the factory, during transport and during installation in the field. The corners are particularly vulnerable because IGU's are generally, though not necessarily, rectangular, and thus the corners are most easily accidentally bumped into other surfaces causing damage to the glass edge. Thus, edge bumpers are configured to protect the glass edges of the IGU, in various embodiments, particularly the corners. As edge bumpers described herein also cover at least some of each face of an IGU, they impart some protection to the faces of the IGU. For example, if an IGU having an edge bumper is laid face down on, or leaned face against, a flat surface, the face of the glass does not touch the flat surface because the edge bumper acts as a spacer between the flat surface and the face of the glass. Also, if similarly protected IGU's are stacked horizontally or vertically against each other, only their respective edge bumpers make contact with each other, thus the IGU's are protected from touching each other.

An edge bumper as described herein can be made of a variety of materials, e.g., plastic, rubber, paper, cotton, cardboard, starch, and the like. In one embodiment, the edge bumper is made of a plastic such as a polyalkalene, e.g. polyethylene, polypropylene, mixtures thereof, and the like; a polyvinyl, e.g. polyvinyl chloride (PVC), polyvinyl fluoride, polyvinylacetate, mixtures thereof, and the like; a polystyrene; a nylon; a rayon; or a polyester. In one embodiment, the edge bumper is made of a biodegradable material, particularly a biodegradable polymer, either synthetic or natural. Generally, it is desirable for a biodegradable polymer to be non-toxic, have good mechanical integrity, i.e. keep its shape, and degrade without toxic products. Examples of biodegradable polymers include polyesters such as polyhydroxyalkanoates (PHA's), e.g. 3-hydroxypropionic acid, polylactic acids (PLA's), poly-3-hydroxybutyrate (PHB), polyhydroxyvalerate (PHV), and polyhydroxyhexanoate (PHH); polyanhydrides, polyvinyl alcohol, polybutylene succinate (a synthetic), polycaprolactone (PCL, a synthetic), starch derivatives, cellulose esters, celluloid, and the like.

In one embodiment, the edge bumper is made of a rubber or a soft pliable plastic, such as PVC, that holds its shape.

In this embodiment, the edge bumper has a unitary body shaped as a U- or C-shaped channel in a closed loop configuration that fits over the IGU and conforms to the edges and at least some portion of the faces of the (outermost) glass panes, about their perimeter. In this embodiment, the edge bumper is stretched or otherwise manipulated so that it fits over the IGU, much like a bumper for a hand held device, such as a smart phone, but only the perimeter portion of each face of the IGU need be covered.

In another embodiment, the edge bumper is made of a plastic, e.g. as described above, where the plastic is rigid or semi-rigid. In one embodiment, the edge bumper is extruded as a U- or C-shaped channel and then cut to size to protect an IGU. In one embodiment, the extruded channel is cut as individual pieces that each protect one side of an IGU. In one embodiment, the ends of the individual channel pieces are cut at an angle so that when all four pieces are fitted onto the IGU, they fit closely together at the edges so as to protect the corners of the IGU. In one embodiment, the channel is extruded as a unitary member that is folded around the IGU after extrusion. One such embodiment is described in relation to FIGS. 2C and 2D.

Figure 2C:
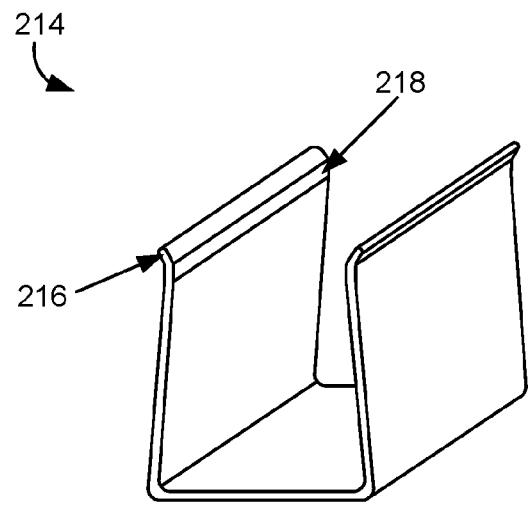
FIGS. 2C-D depict aspects of an edge protection device.
Figure 2C:
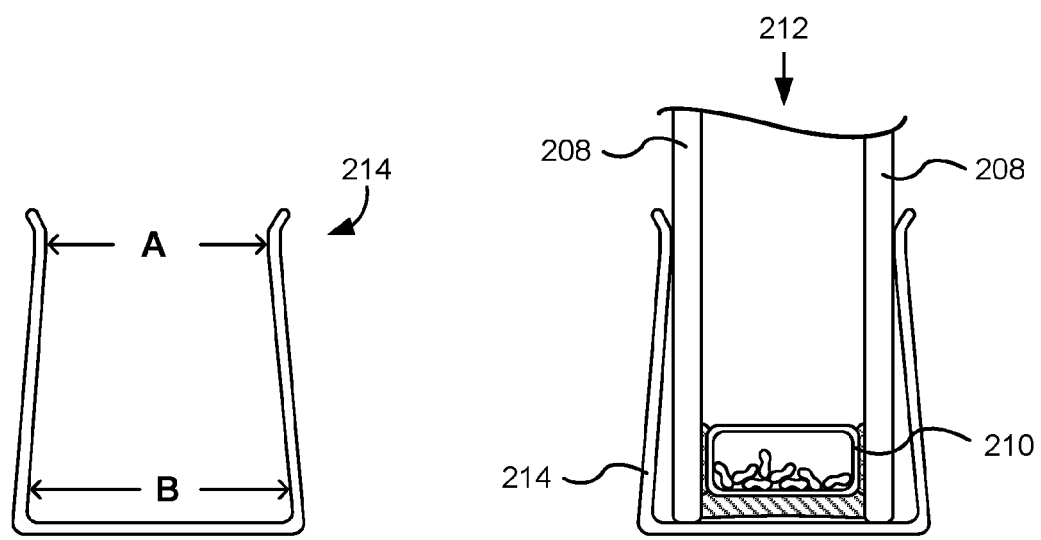

FIG. 2C depicts a perspective of a portion of channel, 214, that can be used to form an edge bumper as described herein. Channel 214 has a generally U-shaped cross section, which is narrower at the opening of the channel, see dimension A (cross section of channel 214, lower left of FIG. 2C), than at the base of the channel, see dimension B. Dimension A is smaller than the thickness of the IGU to which channel 214 is to be applied in order to form the edge bumper. Because channel 214 is generally thin, e.g., the material comprising channel 214 is between about 1 mm and about 10 mm thick, typically between about 1 mm and about 5 mm thick, the IGU can be squeezed into the channel through dimension A and seat into the bottom of the channel, as depicted in the lower right cross section of FIG. 2C. The edges of glass panes, 208 (see also FIG. 2B), of IGU 212 (spacer 210 depicted with primary and secondary sealant around it, and desiccant inside it), may rest against the base of channel 214 and are protected by it. Channel 214 may have a lip, 216 which allows more facile entry of the IGU into the channel, e.g., the channel is guided onto the edge of the IGU, facilitated by the open nature of the lip on the other side of the opening of channel 214. The channel may also have at least some portion of its interior surface (surface inside the channel) that is configured to contact the faces of the glass panes of the IGU in a substantially parallel fashion. In this example, channel 214, has a portion, 218, of its inner surface that mates with the glass of the IGU in order to achieve better hold onto the glass. By virtue of the rigidity of channel 214 and dimension A, there is a spring action so that channel 214 is held onto the glass without slipping off. In one embodiment, channel 214 is made of a rigid or semi-rigid plastic material, e.g., a biodegradable polymer.

Figure 2D:
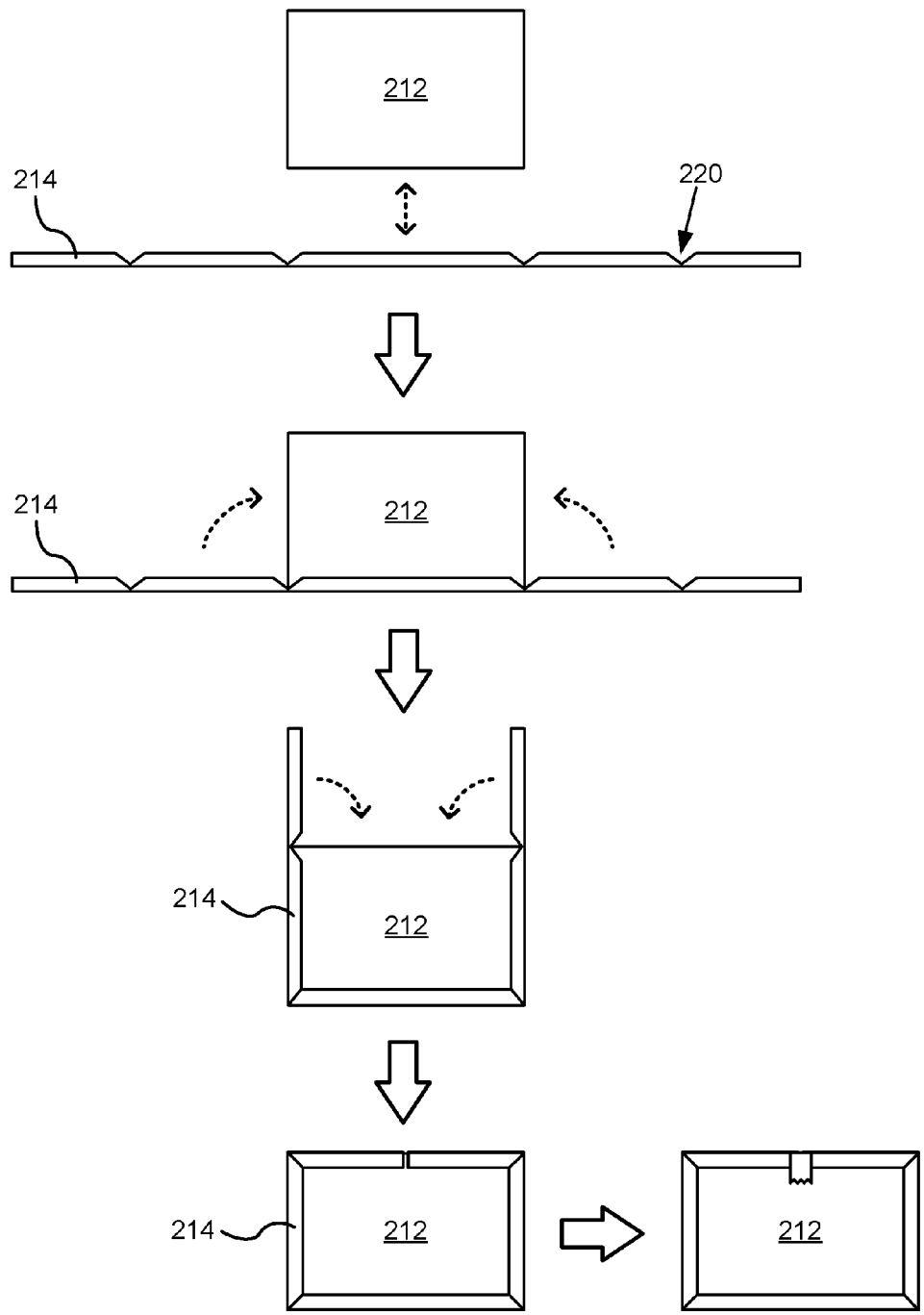

FIG. 2D shows aspects of a method of making an edge bumper from channeled material, e.g., channel 214 as described in relation to FIG. 2C, and installing the edge bumper. For example, IGU 212 is fabricated. A portion of channel 214 is extruded; the length of the portion is approximately the length of the perimeter of IGU 212. A series of notches, 220, are cut into channel 214. These notches are cut at positions where the edge bumper will be folded to accommodate the corners of IGU 212. The bottom portion of the channel (see FIG. 2C) is left intact so that the corners of the IGU glass will be protected when the channel is folded around the edges of the IGU. The notches allow this folding, while the material remaining at the bottom of the channel forms the vertex of the fold and protects the corners of the IGU once applied thereto. The notches thus delineate sub-portions of a unitary portion of channel 214; each sub-channel will each fit along an edge of IGU 212. One embodiment is an edge bumper as described, having at least three notches for folding to accommodate corners of the IGU. If only three notches are used, the ends of the bumper will meet at the corner that is not covered by a notched/folded section of the bumper. These ends may be taped to aid in securing them during handling. In the embodiment depicted in FIG. 2D, there are four notches, so that the ends can meet along a side of the IGU. This protects all the corners equally, as each is protected by a notched section of the channel.

In one embodiment, the dimensions of the IGU are sent to an extrusion machine (or a machine that dispenses channel previously extruded) so that notches 220 can be cut in the appropriate positions in the extrusion as it is dispensed. This saves valuable time and money, because the edge bumper is manufactured using the dimensions of the IGU from the apparatus that makes the IGU, only after the IGU is actually fabricated and specifically to fit the IGU coming off the IGU fabrication line. Thus, there is no need to fabricate a large stock of edge bumpers in anticipation of making a number of IGU's. By using biodegradable material for the edge bumper, there is less worry about disposal in the field, e.g., during installation of the IGU into a building.

Referring again to FIG. 2D, starting from the top and moving downward of the figure, edge bumper 214, of the appropriate length, is notched appropriately and is fitted onto IGU 212 along one edge. The two adjoining sub-portions of bumper 214 are fitted along the edges orthogonal to the first edge fitted with channel 214 as depicted by the dotted arrows. Finally, the two remaining sub-portions are folded to cover the edge of IGU 212 opposite the first edge. This is an efficient way of applying channel 214 to the IGU because it requires only two folding operations to cover four edges of the IGU. These operations can be done manually or in automated fashion, e.g., where a suction cup device holds, rotates and translates the IGU appropriately and other means, e.g. mechanical arms, grabbers, posts, walls, rollers and/or similar devices, are used to facilitate folding operations.

As noted in FIG. 2D, tape may be applied across the ends of channel 214 in order to ensure that it stays on IGU 212 until its removal is desired. In this example, a piece of tape is applied to one side of the IGU, over the edge bumper, and onto the other side of the IGU so that the edge bumper is held to the glass on both sides of the IGU.

One of ordinary skill in the art would appreciate that the folding operations can be performed in a variety of ways. Also, the channel may be applied to the IGU as it is extruded and notched, e.g., rather than cutting the full length, notching and then applying.

In one embodiment, the bumper is applied as a hot or warm extrusion that is pliable during application to the IGU. The pliable extrusion is molded to each edge of the IGU, e.g. as the IGU is rotated in a plane parallel with the face of the glass panes of the IGU. At the corners, when applying the pliable extrusion and molding it to the edge of the IGU, the pliable material is folded, on each of the respective faces of the glass panes, to accommodate the extra material that occurs when folding a material around a corner. In one embodiment, the pliable extrusion is cut in a length sufficient so that the ends of the unitary piece of pliable extrusion can meet and/or overlap and bond to each other. In another embodiment, the pliable extrusion is cut in a length sufficient so that the ends of the unitary piece of pliable extrusion do not meet, but rather a small gap remains (e.g. as depicted in FIG. 2D, the gap in channel 214 (covered by the tape)) in order to aid in removing the pliable material. The pliable material may harden to some extent in order to hold to the glass and also to aid in removal, i.e. the material can be peeled off without significant, or any, ripping or tearing.

One embodiment is a method of manufacturing an insulated glass unit (IGU), the method including: (a) fabricating an electrochromic device on a transparent substrate to create an electrochromic window pane; (b) fabricating an insulated glass unit (IGU) comprising the electrochromic window pane; and (c) applying an edge bumper to the IGU. In one embodiment, the bumper includes a U-channel cap which fits over the glass edges at the perimeter of the IGU. In one embodiment, the bumper includes an elastomeric or plastic material. In one embodiment, the method further includes transporting the IGU, with the bumper applied, from a manufacturer to an installer. In one embodiment, the method further includes strengthening the electrochromic window pane prior to installing the bumper. In one embodiment, strengthening includes laminating a second pane to the electrochromic window pane while in the IGU. In one embodiment, applying the edge bumper to the IGU includes folding an extruded material, from which the U-channel is comprised, around the perimeter of the IGU. In one embodiment, the extruded material is notched to accommodate folding at the corners of the IGU. In one embodiment a piece of adhesive tape (e.g. masking tape) is used to secure the edge bumper to the IGU. In one embodiment, the extruded material is biodegradable.

Another embodiment is a method of manufacturing an edge bumper for an IGU, the method including: 1) receiving dimensions of the IGU from a unit that fabricated the IGU, 2) cutting a U-channel material to the appropriate length to cover the perimeter of the IGU, and 3) notching the U-channel material appropriately to accommodate folds in the U-channel material at the corners of the IGU. In one embodiment, the U-channeled material has four notches and five sub-portions. Another embodiment is a method of applying the aforementioned notched U-channel material including: 1) applying the central sub-portion of the notched U-channel material over one edge of the IGU, 2) folding the adjoining two sub-portions over the two orthogonal edges to the one edge, and 3) folding the remaining two sub-portions over the remaining edge, opposite the one edge. In one embodiment, the method is performed in the order: 1, 2 and then 3. Another embodiment is an apparatus configured to carry out the operations 1, 2 and 3 in an automated fashion. In one embodiment, the method further includes securing the U-channel to the IGU with a piece of adhesive tape.

One embodiment is an apparatus configured to carry out the operations described herein with relation to edge bumper manufacture, and/or installation on an IGU.

The embodiments described herein that relate to edge bumpers are described in terms of protecting rectangular IGU's. One of ordinary skill in the art would appreciate that other shapes for IGU's are possible, and the edge bumpers, methods of manufacture and application thereof apply to other IGU shapes. For example a trapezoidal IGU, triangular or other polygonal IGU would accommodate the edge bumpers described herein, e.g., a rigid bumper would need only have the appropriate number of notches to fold around the polygonal IGU. In another example, a round or oval IGU would accommodate an edge bumper with, e.g., many notches if made of a highly rigid material (in order to make the curves without breaking the bumper) or a more flexible material can be used with no notches.

Laminating an EC pane with a reinforcing substrate (or pane) after incorporation into an IGU has many benefits. For example, lamination after the EC pane is assembled in an IGU protects the EC device during the lamination process and provides ease of handing. This is particularly true if the EC device is on an inner facing surface of the IGU, that is, in the interior insulating region of the IGU, because lamination processes involve contacting the outer surfaces of the glass panes making up the lamination structure under relatively harsh conditions. Under such conditions, the EC device would be damaged if it was located on the outer surface of a lamination structure. The IGU thus protects the device during lamination. If the EC device is located on an outer facing surface of glass on the IGU, lamination of the EC pane would require lamination directly onto the EC device with the reinforcing pane and/or the adhesive used to attach it (the lamination pane). While lamination can be conducted without damaging the EC device, this approach has some downsides. Most notably, the IGU would be a less effective thermal insulator because radiation is blocked only at the interior of the IGU. Further, the exposed edges of the EC device, located around the perimeter of the IGU, may provide an ingress point for moisture after installation.

Many different lamination processes can be employed in the disclosed embodiments. Examples include roll pressing and autoclaving, vacuum bagging, and liquid resin lamination, each of which is well known in the window fabrication industry. In one embodiment, liquid resin lamination is used to strengthen an EC pane after it is incorporated into an IGU.

Figure 3A:
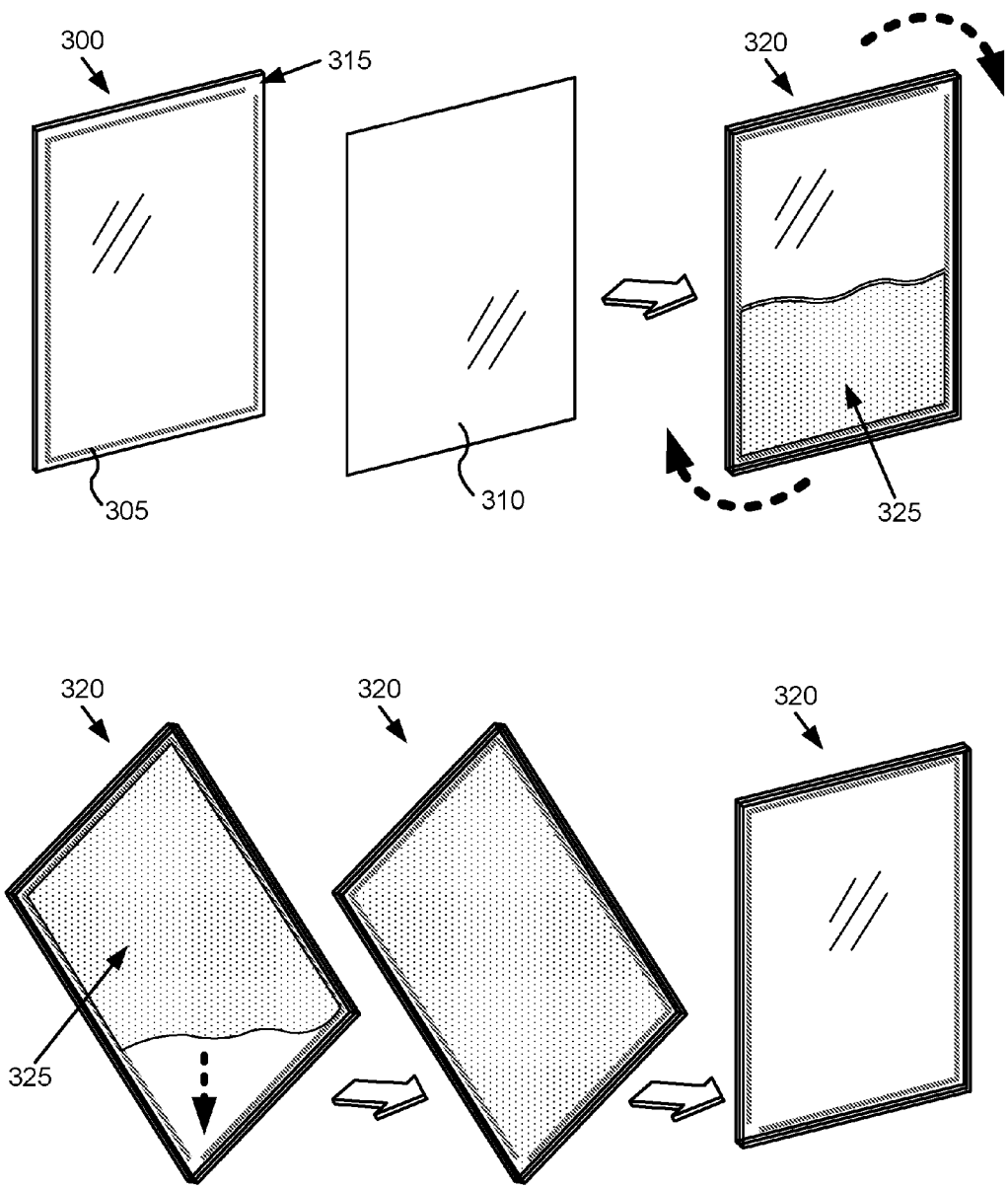
FIG. 3A depicts liquid resin lamination of a reinforcing sheet to an IGU.

FIG. 3A schematically depicts aspects of a process flow for liquid resin lamination of an IGU, 300. In FIG. 3A, IGU 300 is drawn in less detail than for example IGU 212 described in relation to FIG. 2B. In this example, IGU 300 has an EC pane and a non-EC pane. Typically, double sided tape, 305, is applied to a perimeter region of the EC pane. A gap, 315, is left in the perimeter tape, for example, in a corner of the pane. A reinforcing pane, 310, is applied to the double-sided tape, so that a triple pane (see also FIG. 3B, in this example, the reinforcing pane is laminated to the EC pane of the IGU, and there is also the non-EC pane of the IGU which is not part of the laminate) structure, 320, is formed. A liquid resin, 325, is introduced, for example from the bottom as depicted, in the volume formed between the EC pane and reinforcing pane 310. This can be accomplished, for example, by leaving a small portion of the backing of the tape on when pane 310 is applied to the tape and registered with the EC pane. A dispensing nozzle, in the shape of a thin blade, is inserted in between pane 310 and the portion of the tape with the backing remaining. After the resin is introduced into the volume and the blade removed, the remaining tape backing is removed so that the only means of exit for the resin is gap 315. As indicated by the curved and dotted heavy arrows, unit 320 is then rotated so that the liquid resin 325 flows toward gap 315 (as indicated in the lower left diagram by the heavy dotted arrow downward). The appropriate amount of resin is introduced into the volume so that when the resin covers the entire area between the panes and within the tape, the panes are substantially parallel to each other. Once the volume is filled with resin, the resin is cured, for example, via heating, a catalyst and/or exposure to UV irradiation to form a strong bond between the panes. In the final assembly, as depicted in the lower right of FIG. 3A, the cured resin has the desired optical, mechanical and other properties of the lamination. Using liquid resin lamination imparts minimal if any stress on the EC pane during lamination.

Figure 3B:
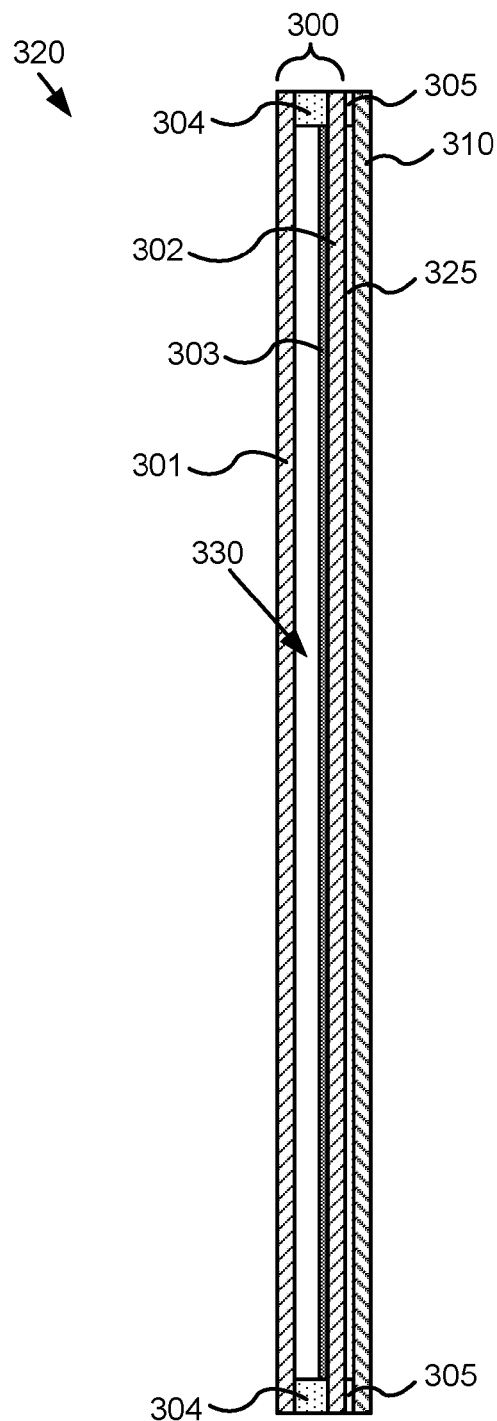
FIG. 3B depicts a cross section of the laminated IGU as described in relation to FIG. 3A.

FIG. 3B is a cross section showing more detail of the final assembly 320. The IGU portion, 300, includes a first pane, 301, and an EC pane, 302, which includes an EC device, 303, thereon. Panes 301 and 302 are separated by a sealing separator, 304, which spans the perimeter of the panes and has seals between it and each pane. An interior space, 330, is defined by the panes and the sealing separator. Tape 305 lies between (and proximate to the perimeter) of the face of the EC pane outside of the IGU's interior space and pane 310. Inside the volume created between the EC pane and pane 310 is the cured resin, 325.

Because resin based lamination relies on a sheet or film of resin sandwiched between the two glass panes to be laminated, choice of resin type can impart an optical characteristic to the window unit. In certain embodiments, the resin may contain additives that impart a desired optical property to the resulting laminate. Examples of such optical properties include color, opacity, scattering and reflectivity. In a specific example, the resin imparts a blue color. This can be particularly beneficial when used with some EC devices that have a naturally yellowish tint. The optical property can be imparted by adding dyes, pigments, scattering particles, metallic dust, etc. to the liquid resin prior to introduction into volume for lamination. In certain embodiments, the blue color is achieved as a result of a chemical reaction that takes place after the resin is introduced into the volume between the panes. For example, the reaction may be catalyzed by the same energy or reagent that catalyzes the curing of the resin. In another embodiment, the resin changes to a blue color after curing, for example, by exposure to normal ambient lighting and/or specific irradiation and/or heating post cure.

Figure 4C:
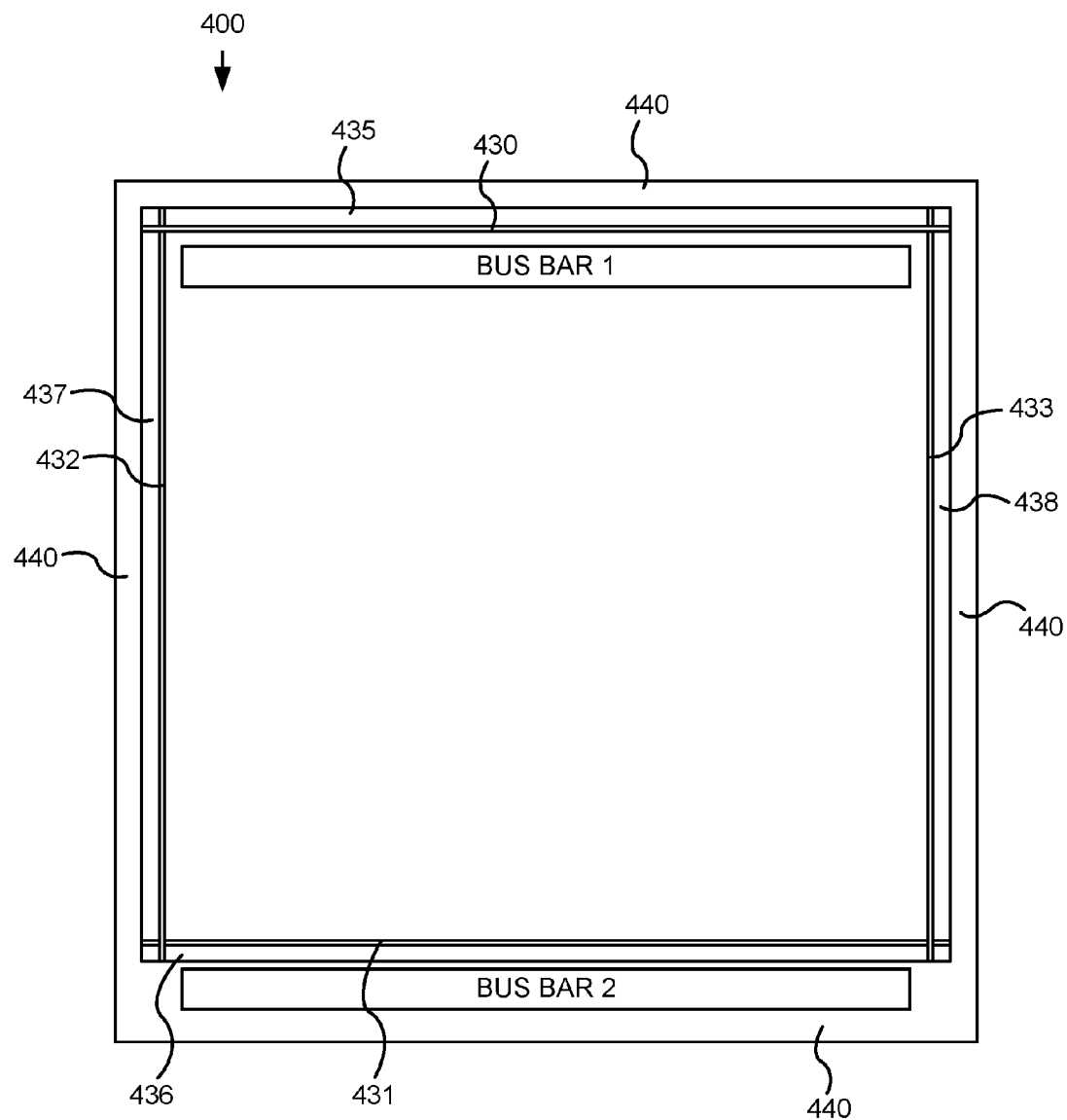
FIG. 4C is a schematic top view of the electrochromic device described in relation to FIGS. 4A-B.

Particular examples of electrochromic panes are described with reference to FIGS. 4A-C. FIG. 4A is a cross-sectional representation of an electrochromic pane, 400, which is fabricated starting with a glass sheet, 405, for example as outlined in process flow 100. FIG. 4B shows the cross sectional view from another side of EC pane 400, and FIG. 4C shows a top view of EC pane 400 (FIG. 4A is the view from the right or left side as depicted in FIG. 4C; and FIG. 4B is the view from the bottom side looking up as depicted in FIG. 4C). FIG. 4A shows the individual electrochromic pane after it has been cut from the glass sheet, edge deleted, laser scribed and bus bars have been attached. The glass pane, 405, has a diffusion barrier, 410, and a first transparent conducting oxide (TCO) 415 on the diffusion barrier. The TCO layer 415 is the first of two conductive layers used to form the electrodes of the electrochromic device fabricated on the glass sheet. In this example, the glass sheet includes underlying glass and the diffusion barrier layer. Thus in this example, the diffusion barrier is formed, then the first TCO, then the EC stack, and then the second TCO. In one embodiment, the electrochromic device (EC stack and second TCO) is fabricated in an integrated deposition system where the glass sheet does not leave the integrated deposition system at any time during fabrication of the stack. In one embodiment, the first TCO layer is also formed using the integrated deposition system where the glass sheet does not leave the integrated deposition system during deposition of the EC stack and the (second) TCO layer. In one embodiment, all of the layers (diffusion barrier, first TCO, EC stack and second TCO) are deposited in the integrated deposition system where the glass sheet does not leave the integrated deposition system during deposition.

After formation of the EC device, edge deletion and laser scribes are performed. FIG. 4A depicts areas 440 where the device has been removed, in this example, from a perimeter region surrounding the laser scribe trenches, 430, 431, 432 and 433, which pass through the second TCO and the EC stack, but not the first TCO, are made to isolate portions of the EC device, 435, 436, 437 and 438, that were potentially damaged during edge deletion from the operable EC device. In one embodiment, laser scribes 430, 432, and 433 pass through the first TCO to aide in isolation of the device (laser scribe 431 does not pass through the first TCO, otherwise it would cut off bus bar 2's electrical communication with the first TCO and thus the EC stack). The laser or lasers used for the laser scribes are typically, but not necessarily, pulse-type lasers, for example diode-pumped solid state lasers. For example, the laser scribes can be performed using a suitable laser from IPG Photonics (of Oxford Mass.), or from Ekspla (of Vilnius Lithuania). Scribing can also be performed mechanically, for example, by a diamond tipped scribe. One of ordinary skill in the art would appreciate that the laser scribes can be performed at different depths and/or performed in a single process whereby the laser cutting depth is varied, or not, during a continuous path around the perimeter of the EC device. In one embodiment, the edge deletion is performed to the depth below the first TCO. In another embodiment, a second laser scribe is performed to isolate a portion of the first TCO, for example as depicted in FIGS. 4A-C, near the edge of the glass pane from that toward the interior. In one example this scribe is at least along the edge where bus bar 2 is applied to the first TCO, between bus bar 2 and the edge.

After laser scribing is complete, bus bars are attached. Non-penetrating bus bar (1) is applied to the second TCO. Non-penetrating bus bar (2) is applied to an area where the device was not deposited (for example from a mask protecting the first TCO from device deposition), in contact with the first TCO or in this example, where edge deletion was used to remove material down to the first TCO. In this example, both bus bar 1 and bus bar 2 are non-penetrating bus bars. A penetrating bus bar is one that is typically pressed into and through the EC stack to make contact with the TCO at the bottom of the stack. A non-penetrating bus bar is one that does not penetrate into the EC stack layers, but rather makes electrical and physical contact on the surface of a conductive layer, for example, a TCO.

The TCO layer's can be electrically connected using a non-traditional bus bar, for example, screen and lithography patterning methods. In one embodiment, electrical communication is established with the device's transparent conducting layers via silk screening (or using another patterning method) a conductive ink followed by heat curing or sintering the ink. Advantages to using the above described device configuration include simpler manufacturing, for example, less laser scribing than conventional techniques which use penetrating bus bars, and the fact that the EC device colors to, and under, bus bar 1 (unlike conventional methods which cut an isolation trench through the device when bus bar 1 is a penetrating type bus bar), which provides a larger coloration area. Penetrating bus bar's can be used, for example in place of non-penetrating bus bar 1, but this will sacrifice colorable area and would necessitate a scribe through the first TCO, prior to fabrication of the EC stack on the glass. One embodiment contemplates performing this first scribe for the one or more EC devices on the glass sheet prior to fabrication of the EC device thereon. In such embodiments, the remainder of the method flow, for example as described in relation to FIGS. 1A and 1B, remains analogous.

Figure 5A:
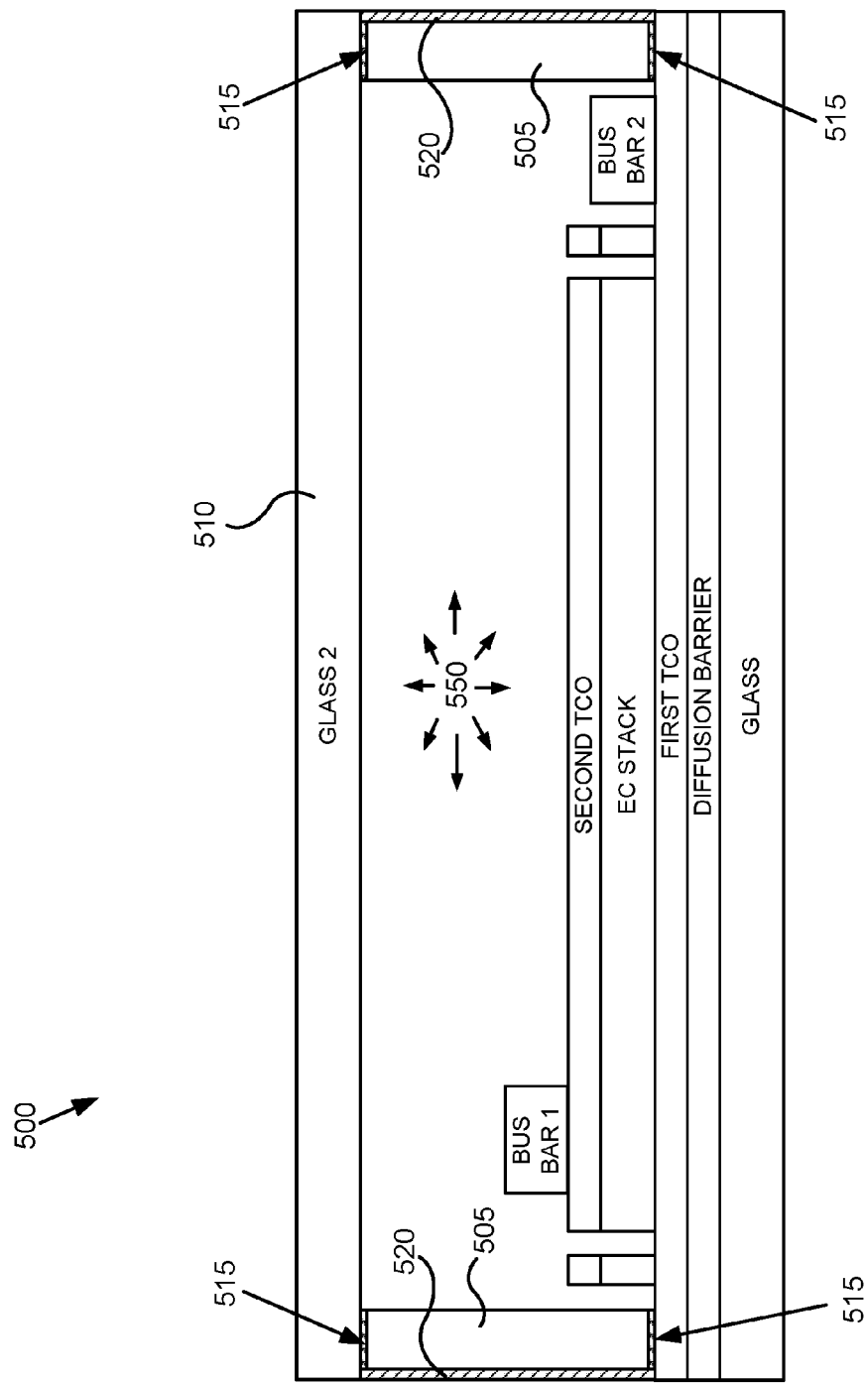
FIG. 5A is a cross section schematic showing the device described in relation to FIGS. 4A-C integrated into an IGU.

As described above, after the bus bars are connected, the device is integrated into an IGU, which includes, for example, wiring the bus bars and the like. In some embodiments, one or both of the bus bars are inside the finished IGU, however in one embodiment one bus bar is outside the seal of the IGU and one bus bar is inside the IGU. FIG. 5A depicts a cross section of the EC pane as described in relation to FIGS. 4A-C integrated into an IGU, 500. A spacer, 505, is used to separate EC pane 400 from another pane, 510. The second pane 510 in this example is a non-EC pane, however the invention is not so limited. Pane 510 can have an EC device thereon and/or one or more coatings such as low-E coatings and the like. Between spacer 505 and, in this example, the first TCO of EC device 400, is a primary seal, 515. This seal is also between separator 505 and the second glass pane. Around the perimeter of separator 505 is a secondary seal, 520 (bus bar wiring traverses the seal for connection to controller). These seals aid in keeping moisture out of the interior space, 550, of the IGU.

Figure 5B:
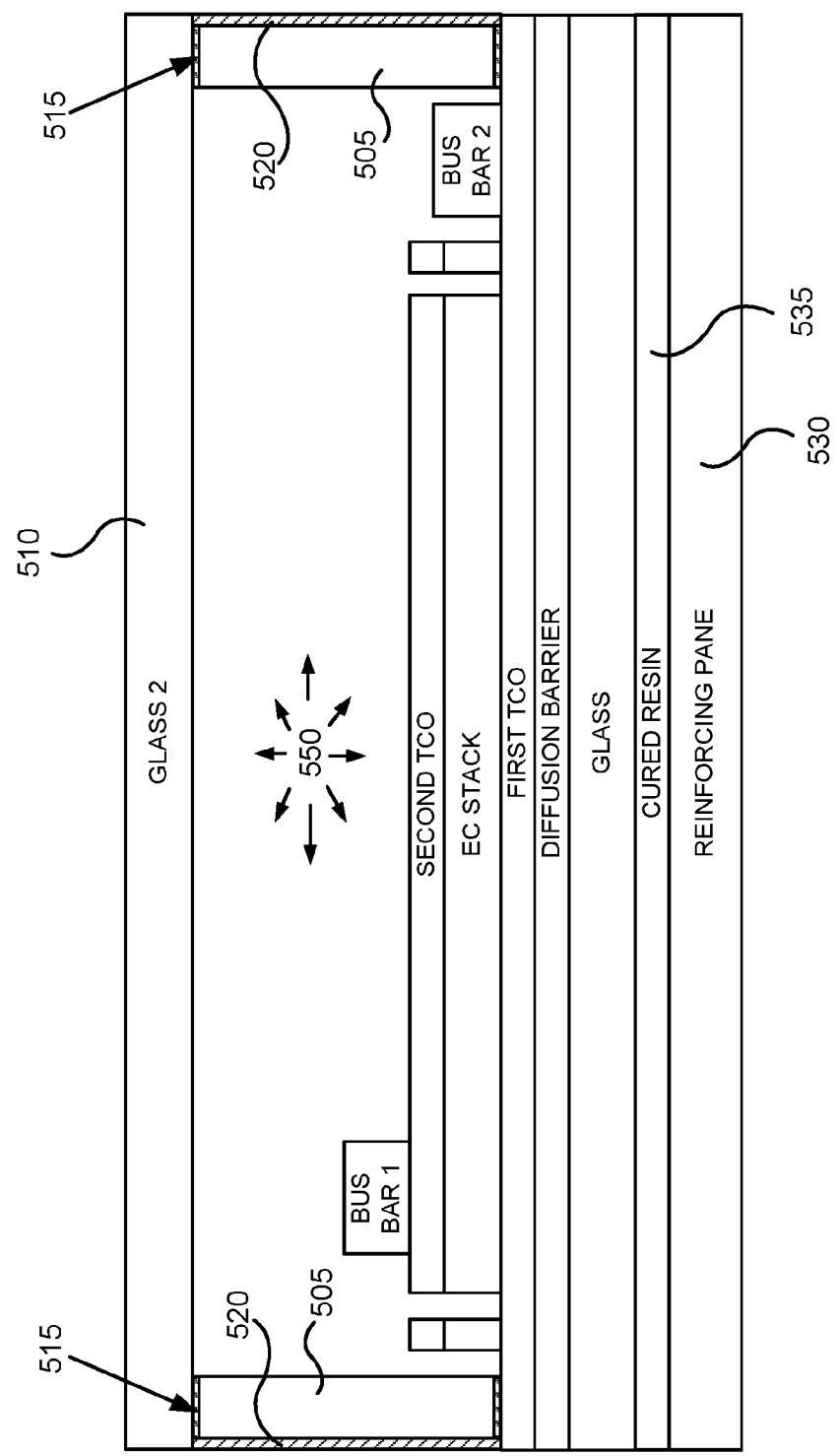
FIG. 5B is a cross section schematic showing the IGU as in FIG. 5A, where the EC pane is strengthened by lamination.

FIG. 5B depicts IGU 500 after lamination with a reinforcing pane, 530. In this example a liquid resin lamination was used, and thus, cured resin, 535, lies between the reinforcing pane and the glass of the EC pane. Although not depicted, one of ordinary skill in the art would appreciate that if glass 2 also had an EC device thereon, it could also be laminated. One embodiment is an IGU including two EC panes separated by an interior space, in one example both EC devices are in the interior space of the IGU, where both EC panes are reinforced. In one embodiment, the EC panes are reinforced with liquid resin lamination as described herein. In other embodiments, one or both of the EC panes are reinforced or strengthened by applying a coating as described herein.

Figure 6C:
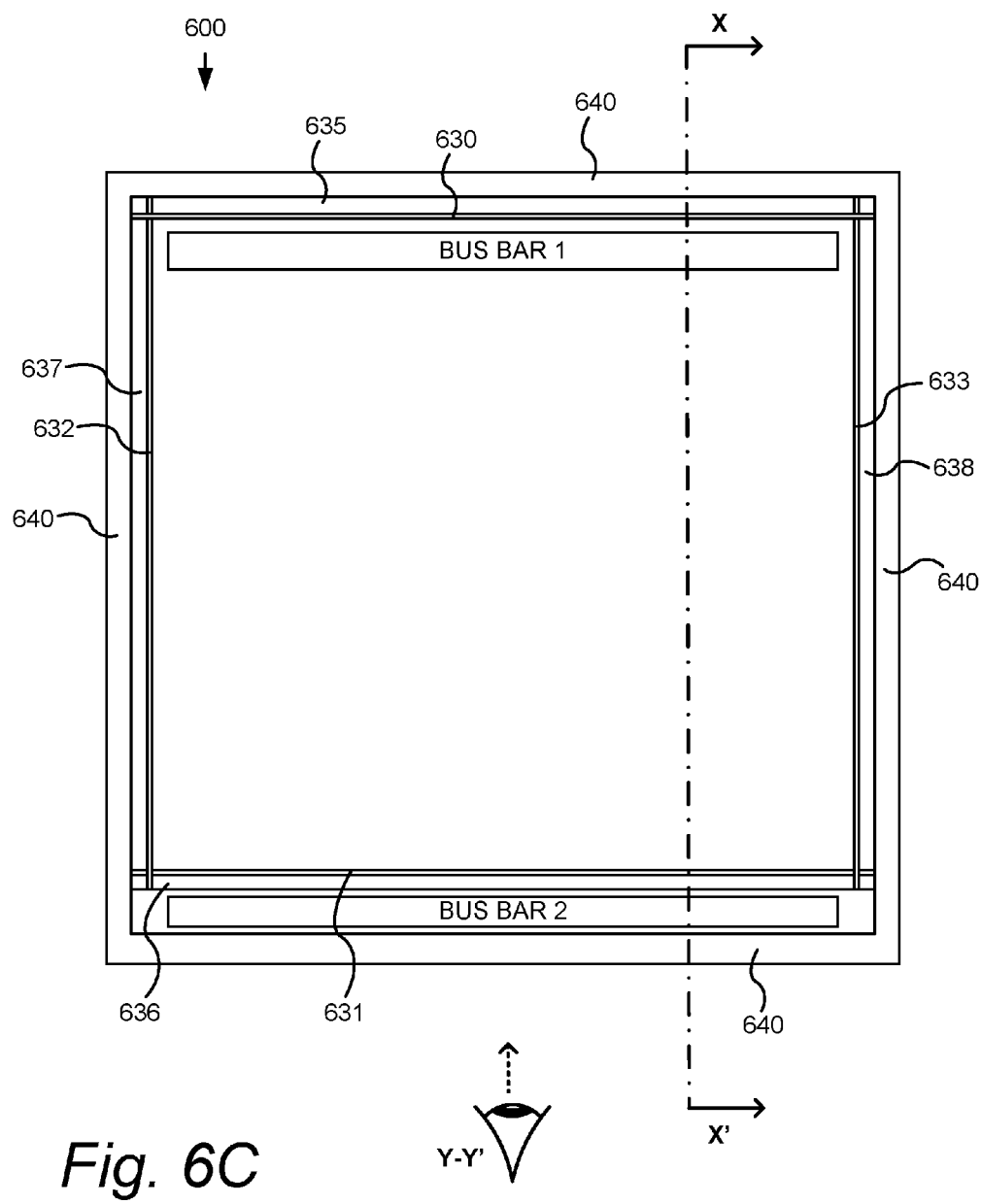
FIG. 6C is a schematic top view of the electrochromic device described in relation to FIGS. 6A-B.
Figure 7:
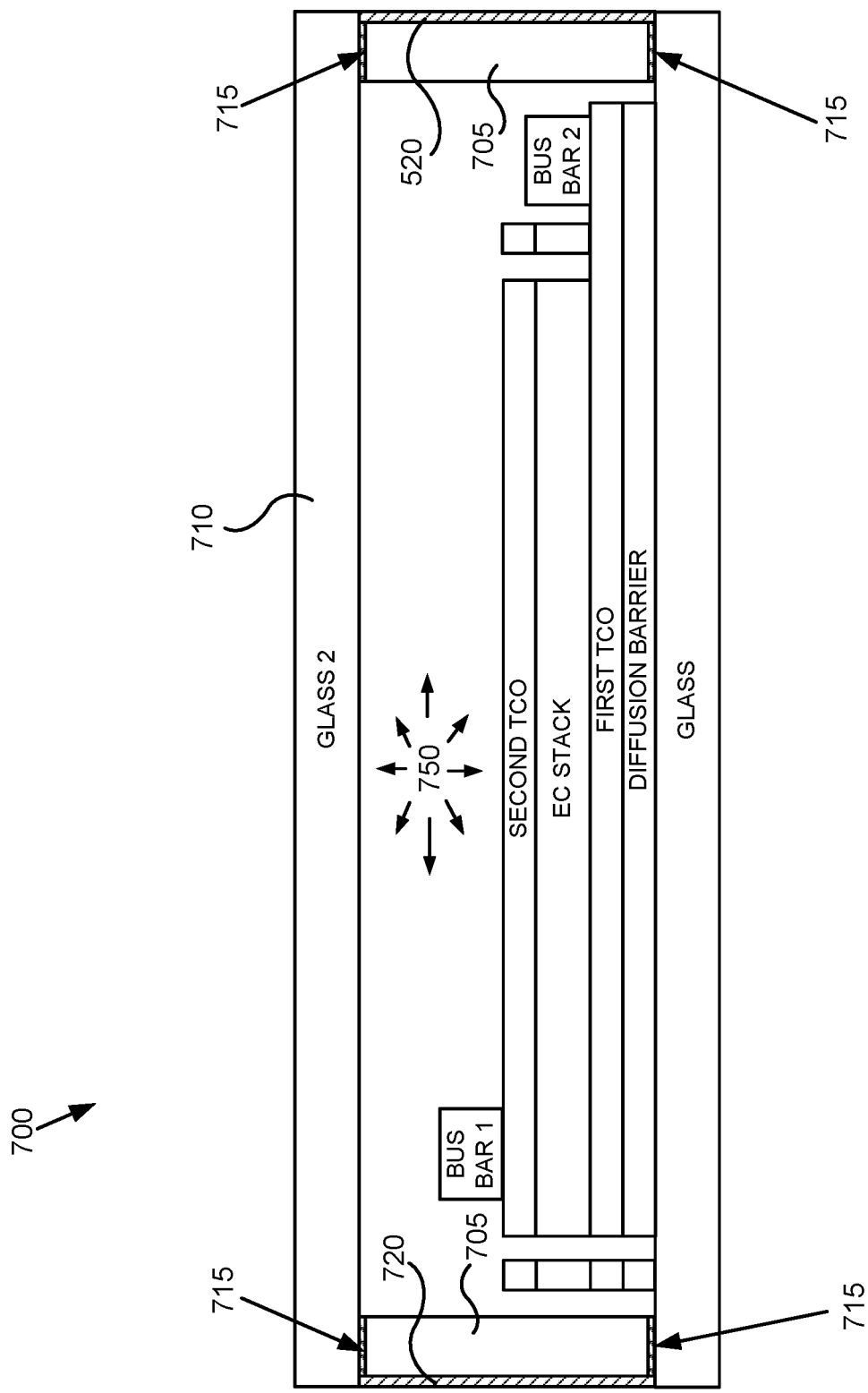
FIG. 7 is a cross section schematic showing the device described in relation to FIGS. 6A-C integrated into an IGU.

FIGS. 6A and 6B are like FIGS. 4A and 4B, showing a construction, 600, which is an EC device fabricated on a glass substrate. FIG. 6C is a top view showing that FIG. 6A depicts cross-section X-X', and FIG. 6B depicts view Y-Y'. In this example, areas 640 represent where the device has been removed, in this example, from a perimeter region surrounding laser scribe trenches, 630, 631, 632 and 633. In this example, laser scribes 630, 632 and 633 pass through the second TCO, the EC stack and the first TCO, and isolate the operable EC device, portions of the EC device, 635, 637 and 638, that were potentially damaged during edge deletion. Laser scribe 631 is made through the second TCO and the device stack, but not the bottom TCO, as this serves as the lower conductor in electrical communication with bus bar 2. In this example, the EC stack, the first TCO and the diffusion barrier were removed in the edge deletion areas 640. This is an example of edge deletion performed to a depth below the first TCO. By removing the lower TCO, and optionally the diffusion barrier, the EC device is more effectively isolated from the ambient when sealed in an IGU, that is, the edges of the TCO (which is part of the EC device) are not exposed to the ambient. Also, the primary seal and secondary seal may be more reliable as they are not subject to delamination of the diffusion barrier or TCO, but rather are made between the spacer and the glass substrate. As depicted in FIG. 6C, edge delete area 640 spans the perimeter of the EC device, around the outer perimeter of the glass. FIG. 7 shows a cross-section as in FIG. 6A incorporated into an IGU, 700. A spacer, 705, is used to separate EC pane 600 from another pane, 710. The second pane 710 in this example is a non-EC pane, however the invention is not so limited. Pane 710 can have an EC device thereon and/or one or more coatings such as low-E coatings and the like. Between spacer 705 and, in this example, the glass substrate of EC device 600, is a primary seal, 715. This seal is also between separator 705 and the second glass pane. Around the perimeter of separator 705 is a secondary seal, 720 (bus bar wiring traverses the primary seal for connection to controller). These seals aid in keeping moisture out of the interior space, 750, of the IGU. Analogous to that depicted in FIG. 5B, IGU 700 can be laminated to another glass sheet using, e.g., a cured resin.

Figure 8A:
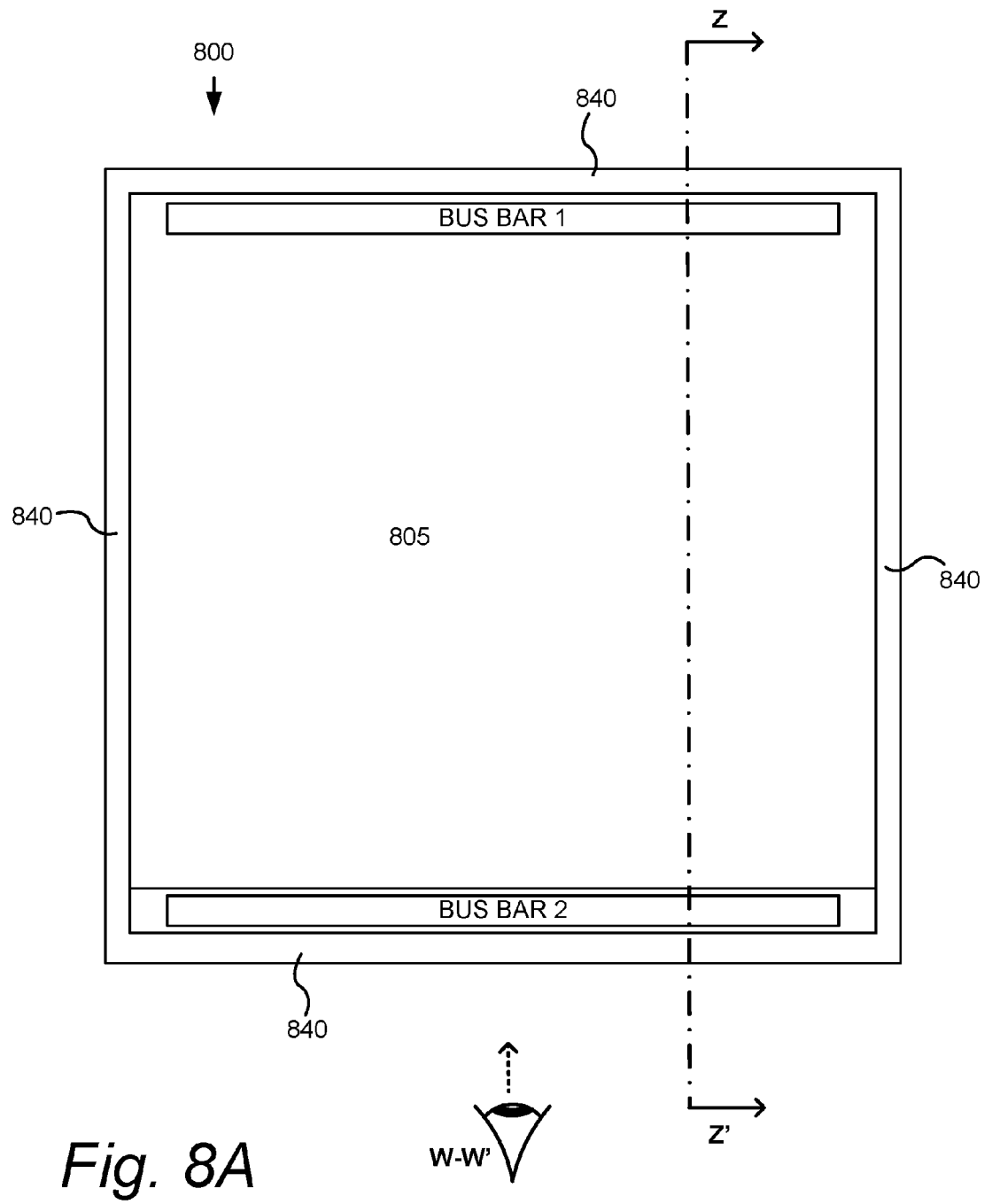
FIG. 8A is a schematic top view of the electrochromic device described in relation to FIGS. 8B-C.

FIG. 8A depicts a top view of a construct, 800, which includes an EC device, 805, on a glass sheet, similar to 600 as depicted in FIG. 6C, but where there are no isolation trenches (scribes) formed in order to isolate portions of EC device 805 due to, e.g., defects in the device about the perimeter due to edge deletion. In this example, edge deletion areas, 840, about the perimeter, are formed using a laser technique that leaves clean edges about the EC device and thus further isolation trenches are not necessary (e.g., using lasers, power densities, spot configurations etc. as described herein). With the advent of tighter control of laser ablation technology, e.g. improved computer algorithms, power supplies, laser focusing and tracking methods, such clean edge deletion is possible without the need for additional laser isolation trenches. One embodiment is an EC device fabricated on a transparent substrate where a perimeter portion (edge delete) of the EC device is removed by laser ablation. In one embodiment, the perimeter portion is between about 1 mm and about 20 mm wide, in another embodiment between about 5 mm and about 15 mm wide, and in yet another embodiment between about 8 mm and about 10 mm wide. In one embodiment, there are no additional isolation trenches, laser or other, made during fabrication of the device.

FIG. 8B depicts cross-section Z-Z' and FIG. 8C depicts view W-W'. Devices fabricated in this manner do not need isolation scribes. Specifically, an EC device is fabricated on a glass substrate, e.g. including all the layers depicted. The edge delete is performed. Also, a portion of the EC device, down to the lower electrode, transparent in this example, is removed in order to create a "landing" for bus bar 2. This landing area is sometimes referred to as a "bus bar pad expose" or "BPE," where a portion of the lower conductor is exposed so that a bus bar can be formed thereon. Formation of the edge delete area and BPE can be performed in any order. In one embodiment, the edge deletion is performed before the BPE. Various aspects of BPE are described in more detail below.

As mentioned above, in various embodiments, a BPE is where a portion of an EC device, down to the lower electrode, e.g. a transparent conducting oxide, is removed in order to create a surface for a bus bar to be applied and thus make electrical contact with the electrode. The bus bar applied can be a soldered bus bar, and ink bus bar and the like. A BPE typically has a rectangular area, but this is not necessary; the BPE may be any geometrical shape or a random shape. For example, depending upon the need, a BPE may be circular, triangular, oval, trapezoidal, and other polygonal shapes. The shape may be dependent on the configuration of the EC device, the substrate bearing the EC device (e.g. an irregular shaped window), or even, e.g., a more efficient laser ablation pattern used to create it. In one embodiment, the BPE substantially spans one side of an EC device and is wide enough to accommodate the bus bar with space at least between the EC device stack and the bus bar. In one embodiment, the BPE is substantially rectangular, the length approximating one side of the EC device and the width is between about 5 mm and about 15 mm, in another embodiment between about 5 mm and about 10 mm, and in yet another embodiment between about 7 mm and about 9 mm. As mentioned, a bus bar may be between about 1 mm and about 5 mm wide, typically about 3 mm wide.

The BPE is typically, but not necessarily, made wide enough to accommodate the bus bar's width and also leave space between the bus bar and the EC device (as the bus bar is only supposed to touch the lower electrode). The bus bar width may exceed that of the BPE (and thus there is bus bar material touching both lower conductor and glass), so long as there is space between the bus bar and the EC device. In embodiments where the bus bar width is accommodated by the BPE, that is, the bus bar is entirely atop the lower conductor, the outer edge, along the length, of the bus bar may be aligned with the outer edge of the BPE, or inset by about 1 mm to about 3 mm. Likewise, the space between the bus bar and the EC device is between about 1 mm and about 3 mm, in another embodiment between about 1 mm and 2 mm, in another embodiment about 1.5 mm. Formation of BPE's is described in more detail below, with respect to an EC device having a lower electrode that is a TCO. This is for convenience only, the electrode could be any suitable electrode, transparent or not.

To make a BPE, an area of the bottom TCO needs to be cleared of deposited material so that a bus bar can be fabricated on the BPE. In one embodiment, this is achieved by laser processing which selectively removes the deposited film layers while leaving the bottom TCO exposed in a defined area at a defined location. In one embodiment, the absorption characteristics of the bottom electrode and the deposited layers are exploited in order to achieve selectivity during laser ablation, that is, so that the EC materials on the TCO are selectively removed while leaving the TCO material intact. In certain embodiments, an upper portion of the TCO layer is also removed in order to ensure good electrical contact of the bus bar, e.g., removing any mixture of TCO and EC materials that might have occurred during deposition. In certain embodiments, when the BPE edges are laser machined so as to minimize damage at these edges, the need for an isolation scribe line (e.g. see description above in relation to FIGS. 8A-C) to limit leakage currents can be avoided—this eliminates a process step, while achieving the desired device performance results.

In certain embodiments, the electromagnetic radiation used to fabricate a BPE is the same as described above for performing edge deletion. The (laser) radiation is delivered to the substrate using either optical fiber or the open beam path. The ablation can be performed from either glass side or the film side depending on the choice of the electromagnetic radiation wavelength. The energy density required to ablate the film thickness is achieved by passing the laser beam through an optical lens. The lens focuses the laser beam to the desired shape and size, e.g a "top hat" having the dimensions described above, in one embodiment, having an energy density of between about 0.5 $J/cm^2$ and about 4 $J/cm^2$. In one embodiment, laser scanning for BPE is done as described above for laser edge delete.

Using the methods described above, where edge delete and BPE are used without additional isolation scribes, the need for masks is obviated, i.e., roll off and/or damaged or unwanted material around the perimeter of the EC device is removed in the edge delete. One of skill in the art would appreciate that if the substrate is held in position by, e.g., clamps or other means, portions of the substrate may not be coated. What is meant is that no masks for patterning the device are necessary. Also, because the edge delete makes a clean edge on the device, there is no need for isolation scribes to further "clean up" the edges, e.g. where an edge deletion does not remove material to form a clean edge where the individual layers of the EC device are exposed. A further advantage to these methods is that there is no need for patterning between deposition of individual layers of the EC device. For example, onto a substrate are coated successive layers of material that form the EC device. Once the EC device layers are fabricated, the edge delete and BPE are performed. These methods are particularly useful for "coat n cut" technology, as described herein, i.e. where the EC device is coated on annealed glass or other substrate that can be cut after the EC device is deposited. The EC device is coated, e.g. as described herein, and the glass substrate is cut according to desired size as described herein. Then the edge delete and BPE are performed. Finally the bus bars are attached. Optionally, a sealant coating can be applied over the entire construct to hermetically seal the device, including the bus bars and the sides of the device where the edges of the individual layers are exposed. With or without such sealant coating, the device may be hermetically sealed in an IGU, e.g., as described in FIG. 5A, 5B or 7.

One embodiment is a method of fabricating an EC device including: 1) coating a substrate with the EC device without the use of patterning of the individual layers of the EC device, 2) edge deleting a perimeter portion of the device about the perimeter of the substrate, and 3) removing a portion (BPE) of the EC device to expose the lower conducting layer; wherein the perimeter portion (edge delete) is between about 1 mm and about 20 mm wide, between about 5 mm and about 15 mm wide, or between about 8 mm and about 10 mm wide.

Figure 9A:
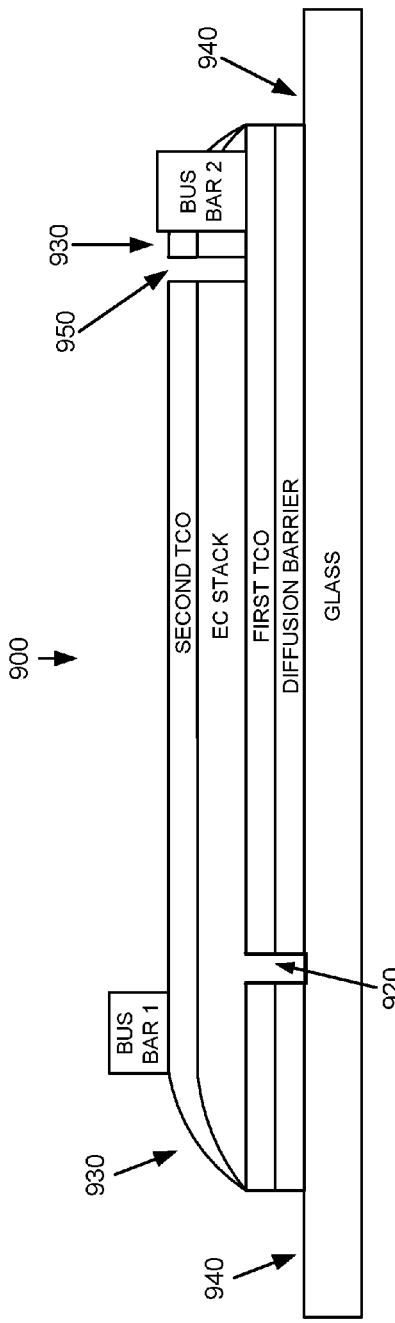
FIGS. 9A-B are cross section schematics depicting two side views of an electrochromic device.
Figure 9B:
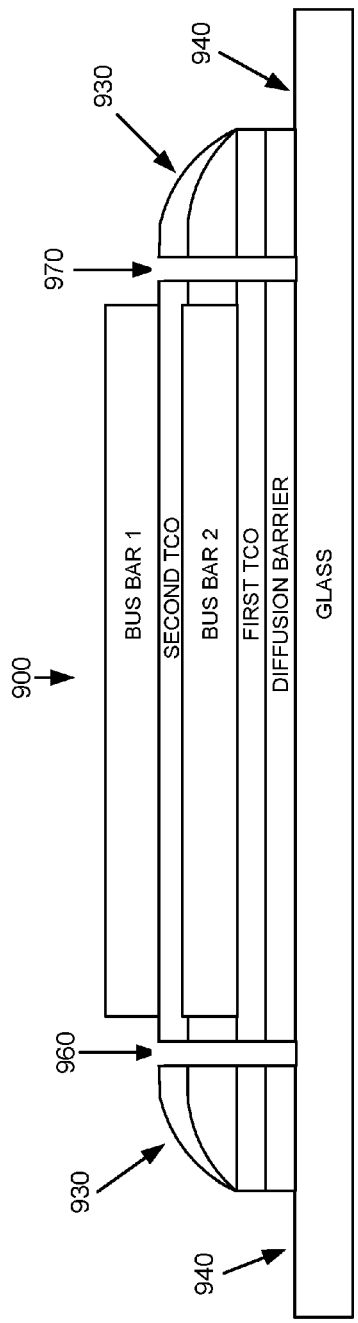
Figure 9C:
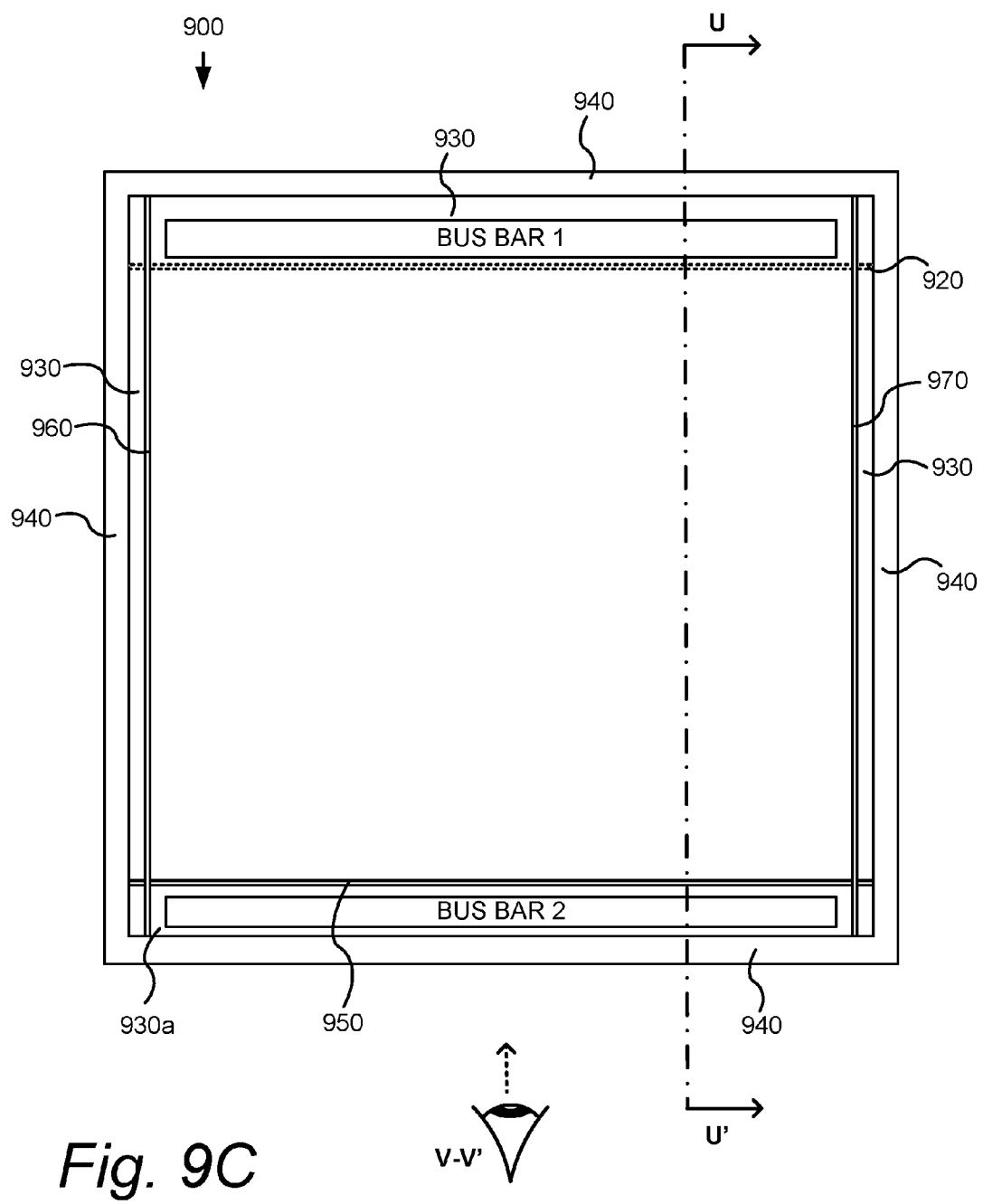
FIG. 9C is a schematic top view of the electrochromic device described in relation to FIGS. 9A-B.

As described in various embodiments herein, sometimes it is desirable to fabricate an EC device using one or more laser isolation scribes. FIG. 9A depicts cross-section U-U' and FIG. 9B depicts view V-V' as indicated in FIG. 9C, of an EC lite, 900, which includes an EC device on a glass sheet. Referring to FIG. 9A, this construct is prepared starting with a glass substrate having a diffusion barrier and a first transparent conductive oxide deposited thereon. Masks may be used to protect a periphery region, 940, or area 940 may be formed by edge deletion as described herein. Before deposition of the EC stack, isolation scribe, 920 is formed, which bifurcates the diffusion barrier/TCO layers into two regions (see FIG. 9C). Then the EC stack and top TCO are formed. Depending upon the deposition parameters, e.g. sputter deposition, the EC stack and top TCO layers may have roll off material, 930, about the perimeter of the area defined by mask or edge delete procedure, on top of the first TCO. Isolation scribe 950 is formed parallel, but on the opposite side of the device from trench 920. In one embodiment, a BPE is used and there is no need for isolation scribe 950. Referring to FIG. 9B, isolation trenches, 960 and 970, are also formed. Isolation trenches 950, 960 and 970 are made to isolate the bulk device from the roll off 930 about three sides of the perimeter. In this example, scribes 960 and 970 pass through first (lower) TCO and diffusion barrier, while scribe 950 does not penetrate the first TCO. Bus bar 1 is applied as a non-penetrating bus bar, while bus bar 2 is a penetrating type (e.g a soldered type) bus bar, which penetrates through the second TCO and EC stack to make electrical connection with the bottom (first) TCO. In one embodiment, when a BPE is used to remove a portion of material 930 where the bus bar to the lower electrode will be placed (bus bar 2 in this example) a non-penetrating bus bar is used. In a particular embodiment, only portion 930a (see FIG. 9C) is removed in the BPE (the portions of 930 on the outside of scribes 960 and 970 are left intact). The EC device functions properly because any short circuiting that might occur due to the roll off 930 touching the first (bottom) TCO is cut off by isolation trenches 920, 960 and 970. Isolation trench 920 is effective because it is filled with EC stack materials and thus is much less electrically conductive than the TCO. Isolation trench 950 breaks electrical connection between bus bars 1 and 2 via the top TCO.

Electrochromic lites such as 900 are sometimes preferred because, e.g., one can deposit the EC device on the glass substrate without having to necessarily use masks. For example, the layers of the EC device are laid down on the glass substrate without any mask or edge delete. Then edge deletion is used to remove material from a periphery portion of the glass substrate. Isolation trenches are used to isolate any remaining roll off and no BPE is needed since a penetrating bus bar is used atop one of the roll off areas isolated by one of the trenches (e.g. 950). As mentioned, however, one embodiment is a device as described in relation to FIGS. 9A-C, but having a BPE rather than isolation scribe 950.

It is noteworthy that the isolation trenches as described above do not color or tint when the EC device is colored. This is because the trenches either contain no EC device material or, as in trench 920, the device material may be compromised in the trench and/or there is no bottom TCO to form a viable device in the region of the trench. If these trenches are not obscured from the viewable area of the window containing the EC lite, then when the window is colored, the isolation trenches will appear as bright lines against the colored background of the tinted window. This high contrast is possible because EC windows can tint to block nearly all transmission through the window, nearly opaque. The contrast between the scribe line and the tinted device is undesirable from an aesthetic standpoint. Note, for example, in the device depicted in FIGS. 9A-C, isolation trenches 920 and 950, proximate the bus bars, are not situated underneath the bus bar and thus are not obscured from view by the bus bar. Note also, that embodiments described in relation to, e.g., FIGS. 5A, 5B and 7 describe spacers that do not cover any portion of the EC device on a glass lite, either the bus bars or scribe lines. The inventors have appreciated that, when fabricating an EC window IGU, the spacer can be configured to obscure the bus bars and any isolation scribes in the assembled IGU. These embodiments and various related advantages are described in more detail below. One embodiment is any EC device described herein, incorporated into an IGU, where the spacer is configured to obscure the bus bars and any scribe lines from the viewable area of the EC device. In certain embodiments, the peripheral edge of the EC device is sealed by the primary seal. In these embodiments, if a BPE is present, the BPE may also be sealed by the primary seal.

Conventionally, physical overlap of the metal spacer with the bus bars is avoided so as to avoid electrical shorting between the bus bar and the metal spacer. That is, typically there is an adhesive between the spacer and the bus bar, but because the IGU formation requires that the components be pressed together, there is a chance of electrical shorting between the spacer and the bus bars. Thus, the spacer and bus bars are configured so as not to overlap. This offset arrangement reduces the viewable area of the EC window. This defeats the desirable objective of maximizing viewable area of an EC window. One way to overcome this issue is to use an insulating spacer, such as a polymeric (foam or non-foamed plastic) spacer or to coat a metal spacer, at least the surface that would otherwise come into contact with the bus bar, with an electrically insulating material so that the coating is an intervening insulator between the bus bar and the spacer. Such coated spacers are described in U.S. patent application Ser. No. 13/312,057, filed Dec. 6, 2011, titled "Spacers for Insulated Glass Units" which is herein incorporated by reference. Spacers described in application Ser. No. 13/312,057 are contemplated as suitable for embodiments described herein, therefore one embodiment is any embodiment described herein that describes a spacer, where the spacer is a spacer described in the Ser. No. 13/312,057 application.

Figure 10:
FIG. 10 depicts a tinted electrochromic pane configured so as not to obscure certain scribe lines as compared with a tinted electrochromic pane configured to obscure all scribe lines.
Figure 10:
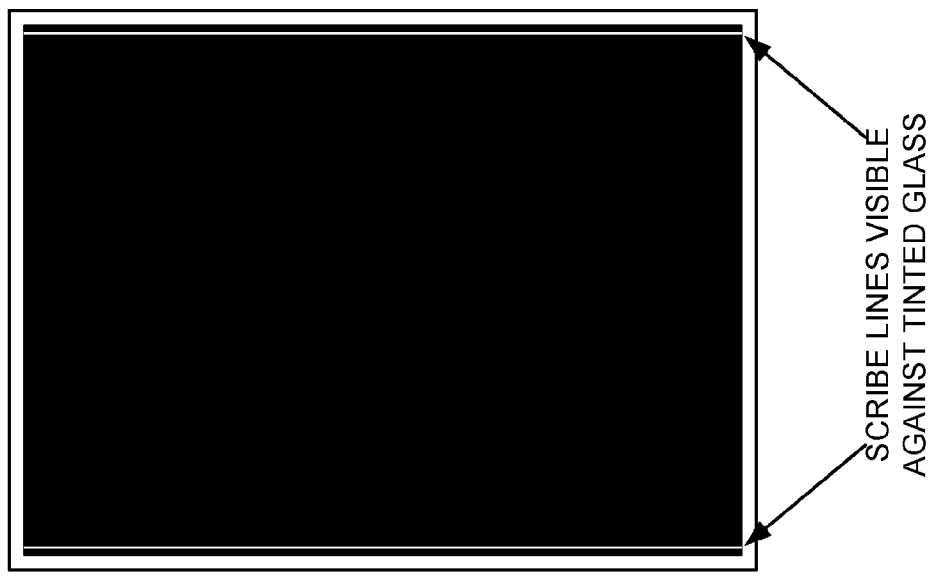

Thus, by using appropriate insulative protections, a spacer can be positioned over a bus bar in order to avoid electrical shorting and also save value EC device real estate by obscuring bus bars from the viewable area of the EC window. The spacer can be positioned to obscure scribe lines as well; this is illustrated in FIG. 10. FIG. 10 depicts an IGU having an EC device in a low transmissivity (tinted) state where the spacer is not positioned over scribe lines; see the IGU on the left of FIG. 10. This is compared to an IGU where the spacer is positioned to obscure the scribe lines; see the IGU on the right of FIG. 10. It is apparent that the visible scribe lines in a darkened window are distracting to the user because of the high contrast between them and the dark background of the tinted window. The obscured scribe lines are not visually distracting because they are obscured from view. One embodiment is an IGU including at least one EC lite having one or more scribe lines, where all scribe lines are obscured by a spacer of the IGU. In one embodiment the spacer is made of a polymeric material, e.g., a foam or non-foam material. In one embodiment, the spacer is a metal spacer. In another embodiment the metal spacer includes an insulative coating at least on a side proximate a bus bar. There are other advantages to this configuration besides obscuring scribe lines; these are discussed in more detail below.

In this context, various embodiments are directed to IGU configurations, where the IGU contains at least one EC device on a lite, and specifically to the relative orientations and spacial relationships between the glass panes of an IGU, the spacer, the EC device, any scribe lines in the device, bus bars, the primary seal and the secondary seal. The described IGU configurations maximize the viewable area of the EC window, while obscuring bus bars and any scribe lines in the EC device that would otherwise contrast highly against the tinted EC lite. Also, these embodiments protect the edge of the EC device from the ambient within the primary seal of the IGU. These embodiments are described in more detail below, in relation to FIG. 11.

Conventional IGU's containing an EC device on a transparent substrate are configured in one of two ways with respect to the EC device. In the first configuration, the EC device covers the entire area of the substrate and the spacer of the IGU rests on the EC device. This configuration potentially exposes the edges of the EC device to the ambient, because the EC device spans the primary seal and the secondary seal. If additional measures are not taken to protect the outer perimeter of the EC device from moisture and the ambient, e.g. allowing a portion of the secondary sealant or an adjacent laminating adhesive to cover the edge of the EC device, the EC device can degrade over time. Specifically, this configuration allows for a path through the device layers for water to enter the otherwise hermetically sealed IGU inner space and compromise the viewable area of the device. In the second configuration, the device is configured so that its area resides within the inner perimeter of the primary seal, i.e. the spacer and the adhesive used to seal the spacer to the glass. That is, the EC device is does not run under the spacer, but lies inside the inner perimeter of the spacer. In other words, moisture would have to traverse the secondary seal and the entire primary seal before it could reach the EC device within the volume of the IGU. This configuration, although more protective of the EC device than the first configuration, sacrifices valuable EC device footprint in the viewable area of the EC window. One reason both of these configurations arise (besides the pathway for water in the first configuration which is avoided in the second configuration) is the bus bar. It is desirable for a number of reasons to use a metal spacer in an IGU. As described above, conventional metal spacers may short on the bus bar and thus the bus bars are positioned on either side of the primary seal, i.e., in the secondary seal area, or within the volume of the IGU.

In the embodiments described below, the bus bar and any scribe lines are obscured by the primary seal, e.g., they are positioned between the spacer and the glass lite so as not to be viewable to the end user of the EC window. The edge of the EC device is protected by the primary seal directly, the bus bars and scribe lines are not visible to the end user, and the viewable area of the EC device is maximized. In other embodiments, the edge delete is performed and then the EC device is sealed within a laminate seal, that is, the bonding adhesive of a laminate of the EC substrate with another pane protects the EC device, including the edge portion where the edge delete leaves an exposed edge. One embodiment is a method of processing an EC device including: 1) removing the EC device from a peripheral region of a substrate by electromagnetic radiation as described herein; and 2) sealing the peripheral edge of the EC device with the primary seal of an IGU or within a laminate seal. The dimensions of the peripheral region (edge delete) are described herein. In one embodiment, the EC device has no scribe lines, only the edge delete and a BPE. In another embodiment, the EC device has only one scribe line, e.g. the scribe line 920 depicted in FIG. 9A.

In certain embodiments, the IGU may be fitted with a capillary breathing tube, e.g. when the IGU is to be deployed at high altitudes and thus pressure changes may necessitate pressure equalizing capability for the IGU. When such capillaries are used, measures are taken to make sure the exchange of gases doesn't allow moisture to enter the IGU, i.e., a drying agent or mechanism is used to dry gases entering the IGU via the capillary.

FIG. 11 is a partial cross section of an IGU, 1100, specifically a portion of IGU 1100 near to and including the edge of the IGU. Insulated glass unit 1100 contains two glass substrates (lites) substantially parallel to each other (see lower portion of FIG. 2B and associated description for general aspects of IGU fabrication). In this example, the lower lite has an EC device, 1110, often referred to as an EC coating. Typically the EC coating is on the order of less than one micron thick to a few microns thick, so this figure is not to scale, i.e. the coating's cross section would not be discernible on this scale (also there may be scribe lines, e.g., proximate the bus bar, but they are not shown). Between the glass lites is a spacer, 1120, which in this example is a metal spacer. Between spacer 1120 and the glass lites is a primary sealant, 1130, for example PIB or other suitable adhesive sealant. This construction is referred to as the primary seal for the IGU; it serves to hermetically seal the interior space, 1150, of the IGU from the ambient, and typically the interior space is charged with an inert gas such as argon. Around the perimeter of the primary seal and between the lites is a sealant, 1160, which forms the secondary seal of the IGU.

On EC coating 1110, between spacer 1120 and the lower lite is a bus bar, 1170. Bus bar 1170 could also be on a BPE. The bus bar may be between about 1 mm and about 5 mm wide, typically about 3 mm wide. In this example, spacer 1120 is coated with an insulating material at least on the side proximate bus bar 1170 so as to avoid inadvertent electrical shorting between the metal spacer and the bus bar. In one embodiment, bus bar 1170 overlaps the edge of the EC device along substantially all, or all, of the length of the EC device. That is, the bus bar resides partially on the device and/or BPE area (penetrating type or non-penetrating type) while the other portion of the bus bar, along the length, resides off the device and/or BPE. While not wishing to be bound to theory, it is believed that this configuration may help prevent coloring under the spacer during operation by effectively shorting the device in that area. Spacer 1120 could alternatively be a polymeric spacer or an insulating material could be applied to the bus bar so that a metal spacer would not short on the bus bar. Also, a metal spacer with a channel to accommodate the bus bar would be suitable.

The dimensions, C, D, E, F and G define a number of configurational aspects of embodiments of an IGU for maximizing viewable area while at the same time protecting the edge of the EC device from the ambient in the primary seal. One such embodiment is an IGU having at least one of the dimensions C, D, E, F and G as described below. In one embodiment, the IGU has a configuration that includes all of the dimensions C, D, E, F and G as described below.

The dimension, C, defines the distance between the interior surfaces of the glass lites. Dimension C is commonly measured because, e.g., the glass lites may be of different thickness, so the dimension C would be the same even if the lites were of different thickness. Dimension C is between about 6 mm and about 30 mm, between about 10 mm and about 20 mm, or between about 12 mm and about 13 mm. Dimension C also is a measure of the height of the primary seal and secondary seal. The length of the primary seal and secondary seals will depend on the size of the IGU, as these seals each span a perimeter inside the perimeter of the glass lites of the IGU.

The width of the primary seal approximates, within ±2 mm, the width, D, of spacer 1120, with some variation due to sealant 1130 squeezing out between the spacer and the glass during IGU fabrication (the negative variation is due to some sealant not expanding to the width of the spacer). In one embodiment, the width of the spacer is between about 5 mm and about 15 mm. In another embodiment, the width of the spacer is between about 5 mm and about 10 mm, in another embodiment between about 7 mm and 8 mm.

The distance, E, defines the width of the secondary seal. In one embodiment, the secondary seal is between about 2 mm and about 15 mm wide, in another embodiment between about 3 mm and about 10 mm wide, and in yet another embodiment between about 4 mm and about 8 mm wide. The width of the secondary seal may be set independently of the other dimensions described in relation to FIG. 11, or, e.g., may be set as an artifact of the choice for dimensions D, F and G. Dimensions F and G are described below.

The distance, F, is the backset, which is the distance between the inner edge of the spacer and the inner edge of a bus bar or a scribe. The backset is a measure of how far "back" a bus bar or scribe is positioned from the inner edge of the spacer, so as to obscure the bus bar and/or scribe from the viewable area of the EC coating. In one embodiment, the backset is between about 1 mm and about 5 mm, in another embodiment, between about 2 mm and about 3 mm, in yet another embodiment about 2 mm. The backset may vary from one side of the IGU to another, as in the described embodiments, the spacer is configured to obscure these features, and these features need not be symmetrically dimensioned with respect to the spacer, the spacer need only obscure them. In other words the backset for a given feature, a scribe line or a bus bar may be different on one side of the IGU as compared to another side of the IGU. FIG. 11 shows that the edge of EC device 1110 is protected by the primary seal. The backset allows any bus bar or scribe line to be obscured and ensures the edge of the EC device is protected by the primary seal.

In one embodiment, the primary seal is a two-part seal. For example the portion of the primary seal that protects the edge of the EC device is a polymeric adhesive seal as depicted, while the outer portion, nearer the outer side of the spacer, where the spacer is over the edge delete area, the seal is a diffusion bonding type seal, where the metal spacer and glass are diffusion bonded on that portion of the spacer.

The distance, G, is a measure of the edge delete as described above. This is the width of the perimeter portion of the EC device removed to expose the glass and/or the diffusion barrier. As described above, in one embodiment, the perimeter portion is between about 1 mm and about 20 mm wide, in another embodiment between about 5 mm and about 15 mm wide, and in yet another embodiment between about 8 mm and about 10 mm wide. In one embodiment the glass is exposed, that is, the EC device and any diffusion barrier are removed in the edge delete. In one embodiment, the edge delete is performed so as to also remove between about 0.5 micrometers (μm) and about 3 μm of the glass substrate, e.g. to ensure complete removal of the EC device and diffusion barrier (accounting for variation in thickness and planarity of the substrate). In one embodiment, the edge delete is performed so as to also remove between about 1 μm and about 2 μm of the glass substrate. In another embodiment, the edge delete is performed so as to also remove about 1.5 μm of the glass substrate.

One embodiment is an IGU where C is between about 12 mm and about 13 mm, D is between about 7 mm and about 8 mm, E is between about 4 mm and about 8 mm, F is between about 2 mm and about 3 mm, and G is between about 8 mm and about 10 mm. In one embodiment, the IGU has two glass panes that are each, independently, between about 3 mm and about 6 mm thick. In one embodiment, the thickness of each of the glass panes is the same. In another embodiment, the thickness of the glass panes does not differ by more than 1 mm.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

We claim:

1. A method of processing an EC device coating on a substrate, the method comprising:
   1) removing the EC device coating from a peripheral region of the substrate, wherein the peripheral region is between about 1 mm and about 20 mm wide and spans the entire perimeter of the substrate; and
   2) sealing the entire perimeter edge of the EC device coating within the primary seal of an insulated glass unit (IGU), wherein the EC device coating is configured to tint to its perimeter edge, wherein the perimeter edge is sandwiched between a spacer of the IGU and the substrate where the primary seal is disposed.

2. The method of claim 1, wherein the peripheral region is between about 5 mm and about 15 mm wide.

3. The method of claim 1, wherein the peripheral region is between about 8 mm and about 10 mm wide.

4. The method of claim 1, wherein at least a portion of the substrate surface is also removed from the peripheral region.

5. The method of claim 4, wherein a thickness of between about 0.5 µm and about 3 µm of the substrate surface is removed.

6. The method of claim 1, wherein removing the EC device coating from the peripheral region of the substrate comprises using laser ablation.

7. The method of claim 6, wherein the energy density of the laser ablation is between about 2 J/cm$^2$ and about 6 J/cm$^2$.

8. The method of claim 6, wherein the laser ablation comprises overlapping laser scanning lines by between about 5% and about 75%.

9. The method of claim 6, wherein the laser ablation has a frequency in the range of between about 11 KHz and about 500 KHz.

10. The method of claim 6, wherein the laser ablation has a pulse duration of between about 100 fs and about 100 ns.

11. The method of claim 1, wherein the EC device coating comprises no electrical isolation scribes.

12. The method of claim 1, further comprising applying one or more bus bars, wherein the one or more bus bars are configured to deliver power to the EC device coating and are also sealed within the primary seal of the IGU.

13. The method of claim 1, further comprising, prior to 2):
   i) forming a bus bar pad expose by exposing a portion of a lower transparent conducting oxide layer, closest to the substrate, of the EC device coating, the EC device coating perimeter edge extending to the bus bar pad expose;
   ii) applying a first bus bar to the bus bar pad expose; and
   iii) applying a second bus bar to an upper transparent conducting oxide layer of the EC device coating.

14. The method of claim 13, wherein the first and second bus bars are backset by between about 1 mm and about 5 mm from the inner perimeter of a spacer used to form the IGU.

15. The method of claim 14, wherein the spacer width is between about 5 mm and about 15 mm.

16. The method of claim 14, wherein the spacer width is between about 5 mm and about 10 mm.

17. The method of claim 14, wherein the spacer is a foam spacer.

18. The method of claim 13, wherein the bus bar pad expose is also sealed within the primary seal of the IGU.

19. The method of claim 1, wherein the primary seal of the IGU comprises polyisobutylene.

20. The method of claim 1, further comprising forming a secondary seal of the IGU, around the outer perimeter of a spacer used to form the IGU.

21. The method of claim 1, wherein the substrate comprises annealed glass.

22. The method of claim 1, further comprising applying a hermetic layer to the EC device coating.

23. The method of claim 1, wherein the EC device coating is all solid state and inorganic.

* * * * *